(12) United States Patent
Wyatt et al.

(10) Patent No.: US 11,308,074 B1
(45) Date of Patent: Apr. 19, 2022

(54) CONTRIBUTIONS AND PARTS DATA PIPELINE FRAMEWORK

(71) Applicant: Amazon Technologies, Inc., Seattle, WA (US)

(72) Inventors: Michael John Ernest Wyatt, Cambridge (GB); Dhrumil Mayank Kumar Upadhyaya, Seattle, WA (US); Kelvin Li, Kent, WA (US); Kunwar Kanishk Singh, Seattle, WA (US); Kenneth Michael Benoit, Ravensdale, WA (US); Xiaozhe Shi, Seattle, WA (US); Deep Dubey, Bellevue, WA (US); Sushanta Das, Kirkland, WA (US); Thomas Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 16/146,944

(22) Filed: Sep. 28, 2018

(51) Int. Cl.
| | |
|---|---|
| *G06F 16/23* | (2019.01) |
| *G06F 9/54* | (2006.01) |
| *G06F 16/28* | (2019.01) |
| *H04L 29/06* | (2006.01) |
| *H04N 21/266* | (2011.01) |
| *H04L 65/60* | (2022.01) |
| *H04N 21/231* | (2011.01) |
| *H04L 65/61* | (2022.01) |

(52) U.S. Cl.
CPC ............ *G06F 16/2365* (2019.01); *G06F 9/54* (2013.01); *G06F 16/288* (2019.01); *H04L 65/4069* (2013.01); *H04L 65/60* (2013.01); *H04N 21/23109* (2013.01); *H04N 21/266* (2013.01)

(58) Field of Classification Search
CPC ...... G06F 16/2365; G06F 16/288; G06F 9/54; H04L 65/4069; H04L 65/60; H04N 21/23109; H04N 21/266
USPC .................................................. 709/217-219
See application file for complete search history.

(56) References Cited

U.S. PATENT DOCUMENTS

| | | | |
|---|---|---|---|
| 8,185,446 B1 * | 5/2012 | Kuznetsova | G06Q 30/016 705/26.1 |
| 8,620,774 B1 * | 12/2013 | Li | G06Q 30/06 705/27.1 |
| 8,805,971 B1 * | 8/2014 | Roth | G06F 9/5072 709/220 |

(Continued)

OTHER PUBLICATIONS

Austin, Claire C. et al. "Key components of data publishing: using current best practices to develop a reference model for data publishing." International Journal on Digital Libraries 18, No. 2 (201 (Year: 2017).*

*Primary Examiner* — Suraj M Joshi
(74) *Attorney, Agent, or Firm* — Patterson + Sheridan, LLP

(57) ABSTRACT

Techniques for managing a parts catalog of part objects corresponding to media content items are provided. Upon receiving a request to build a new part object for a part provider management system for a new content item, one embodiment collects a plurality of contribution references corresponding to a plurality of contributions relating to the new content item. A new part object is built based on the plurality of contributions and using a part creation graph corresponding to a type of the new content item. The new part object is published to a parts catalog for the part provider management system, for consumption by one or more downstream systems.

20 Claims, 21 Drawing Sheets

(56) References Cited

U.S. PATENT DOCUMENTS

| | | | |
|---|---|---|---|
| 2009/0204885 A1* | 8/2009 | Ellsworth | G06F 16/44 715/234 |
| 2010/0131837 A1* | 5/2010 | Lindal | G06F 11/0709 715/234 |
| 2014/0012709 A1* | 1/2014 | Bishop | G06Q 30/0621 705/26.81 |
| 2014/0025822 A1* | 1/2014 | Guha | G06F 9/5038 709/226 |
| 2018/0343484 A1* | 11/2018 | Loheide | H04N 21/44016 |

\* cited by examiner

CONTRIBUTIONS AND PARTS DATA PIPELINE FRAMEWORK

BACKGROUND

The present invention relates to a data ingestion framework, and more specifically, to a data ingestion framework for ingesting data for a digital video streaming service.

Modern digital video streaming service offer digital video streaming for a substantial number of different content items. Additionally, such a digital video streaming service may maintain a variety of different files for each of these different content items, resulting in a substantial number of files that need to be maintained and organized. For example, for a given digital content item, multiple different video encodings may be maintained in various encoding rates and formats. Moreover, different audio tracks in different languages and even in different encoding rates and formats may also be maintained, as well as corresponding subtitle files and various metadata files. Complicating the problem even further, different geographic regions may have their own video files and/or audio files, due to national or regional preferences and cultures. As a result, digital video streaming services may contain significantly more data than can be manually verified. However, as an erroneous encoding or a mislabeled or misclassified file (e.g., an audio track corresponding to a particular episode of a show being mislabeled as the audio track for a different episode of the same show) can severely impact the user experience, as these issues can render the streaming digital video content unwatchable by users.

DETAILED DESCRIPTION

Figure 1A:
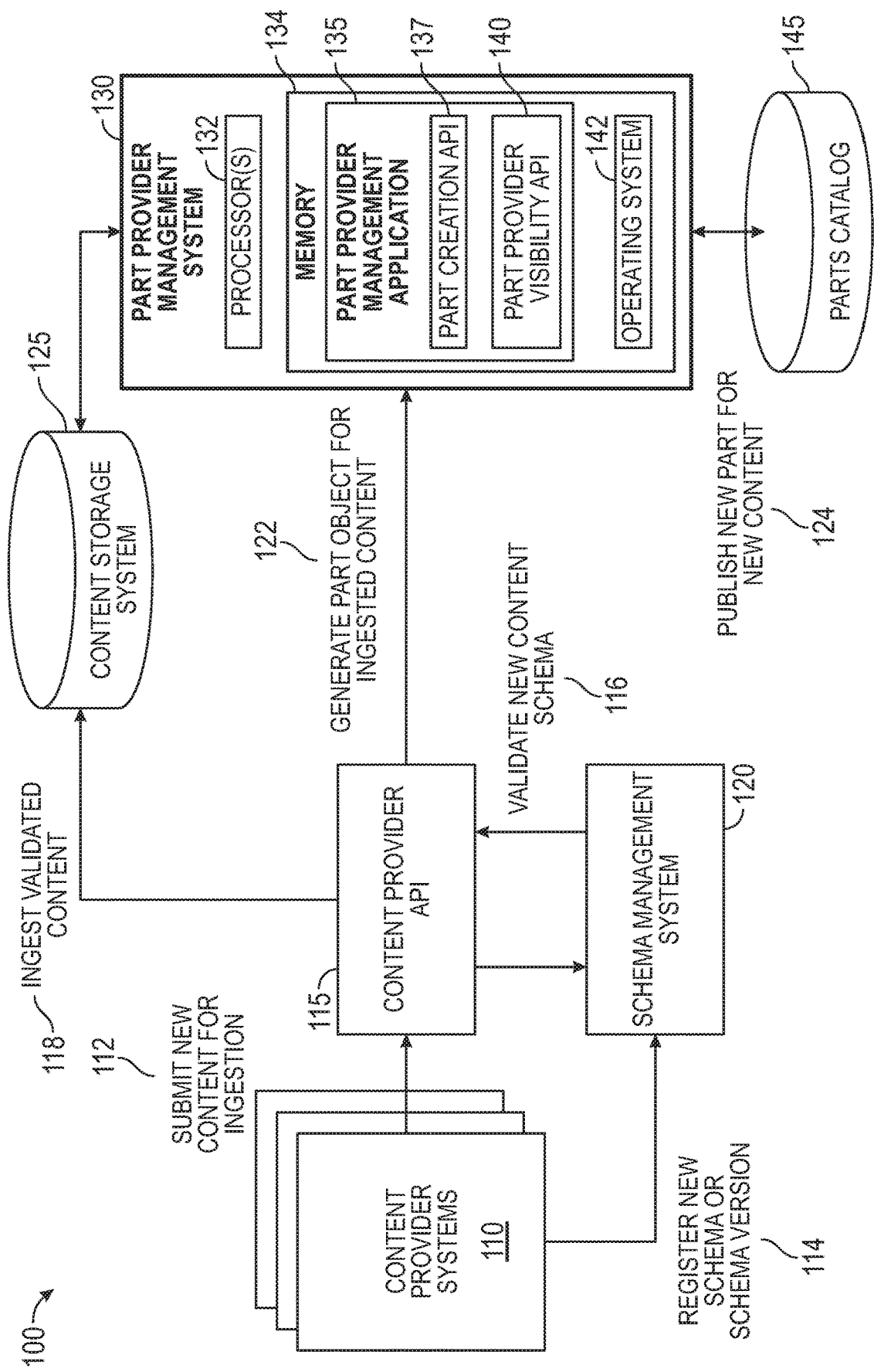
FIGS. 1A-B are a block diagrams of systems that include a part provider management system, according to one embodiment described herein.

Digital video streaming services can provide digital video streaming services for a vast catalog of different content items. Digital video streaming services may also maintain a variety of different files for each of these different content items, resulting in a substantial number of files that need to be maintained and organized. As a given digital content item may have multiple different video encodings in various encoding rates and formats, different audio tracks in different languages and even in different encoding rates and formats, as well as corresponding subtitle files and various metadata files, even a single content item can be associated with a significant number of different files. Complicating the problem even further, different geographic regions may have their own video files and/or audio files, due to national or regional preferences and cultures, adding to the number of files that need to be maintained. As an erroneous encoding or a mislabeled or misclassified file (e.g., an audio track corresponding to a particular episode of a show being mislabeled as the audio track for a different episode of the same show) can severely impact the user experience, since these issues can negatively affect the streaming digital video experience or even render the digital video content unwatchable by users, a technical problem clearly exists in storing and organizing these various files associated with various content items. Such a technical problem is amplified, as the content library for a digital video streaming service may change over time, as content items are added to or removed from the content library.

As such, embodiments described herein provide a part provider management system that can provide an Application Programming Interface (API) configured to receive input documents in any schema and persist them to configurable storage locations. In one embodiment, the part provider management system can validate the input documents with syntax and light semantic checks. Additionally, the part provider management system can send notifications to one or more subscribers, informing the subscribers when the data has arrived (e.g., when an input document has been successfully ingested into the system). Embodiments described herein can allow upstream contributors to provide interesting video-related data asynchronously from the development work needed to process that data and present it to the streaming customer.

In one embodiment, the part provider management system can receive a new schema or schema version and can validate the new schema or schema version. Upon successfully validating the new schema or schema version, the part provider management system can store the new schema or schema version at a schema management system. The part provider management system can subsequently use the new schema or schema version to validate input documents (or, more generally, new content) using the new schema or schema version stored at the schema management system. By providing a schema management system and requiring content providers and other contributors to register schemas for their input documents, embodiments can enable content providers and other contributors to add new schemas and modify existing schemas over time, and can use the defined schemas to validate submitted content of the corresponding type.

Upon successfully validating the new content, the part provider management system can store the new content (or input document) at a content storage system. The part provider management system can then initiate a workflow to create a new part object representing the new content item within a parts catalog of the part provider management system. In doing so, the part provider management system can collect a number of contributions relating to the new content and the part provider management system can filter these contributions down to a subset of contributions. Additionally, the part provider management system can provide one or more validation operations (or a sequence of validation operations, such as a high-level validation operation followed by a deep validation operation) on the contributions in the subset of contributions to further filter out any invalid contributions. The part provider management system could then build a part object from the remaining contributions and can publish the new part object to a parts catalog, for consumption by one or more downstream systems. Doing so provides a framework through which content producers and other contributors can submit new content for ingestion and this content (and any related contributions) can be represented within the parts catalog using a part object(s) for consumption by downstream consumers (e.g., video streaming service applications, advertising systems, digital assistant services, etc.), in a manner that provides for the automatic validation of the content (e.g., using the pre-registered schema(s)) and that standardizes the intake process for content for all downstream consumers of the parts catalog.

FIG. 1A is a block diagram of a system that includes a part provider management system, according to one embodiment described herein. As shown, the system 100 illustrates a plurality of content provider systems 110, a content provider API 115, a schema management system 120, a content storage system 125, a part provider management system 130 and a parts catalog. The illustrated workflow begins at operation 112, where one of the content provider systems 110 submits to the content provider API 115 new content for ingestion by the part provider management system 130. In one embodiment, the content provider systems 110 can submit a link, reference or other identifier through which the new content can be downloaded (directly or indirectly) to the content storage system 125. Additionally, the content provider system 110 can register a new schema or schema version with the schema management system 120 (operation 114). For example, such a schema could be expressed using an extensible markup language (XML) format or, more generally, any suitable format for representing a schema, consistent with the functionality described herein. Upon receiving the new schema or schema version, the schema management system 120 can perform a validation operation to confirm that the registration request and the new schema or schema version are syntactically correct, and can then store the new schema or schema version for subsequent use.

Upon receiving the submission of new content for ingestion, the content provider API 115 can perform a validation operation together with the schema management system 120 to validate the new content's schema (operation 116). For example, the content provider API 115 could retrieve the corresponding, pre-registered schema from the schema management system 120 and could confirm that the new content conforms to the syntax specified in the corresponding schema. Generally, each content provider can define their own schema(s) for use with their content, and can further define different schemas for use with different types of content. For example, a particular content producer (e.g., a movie studio) could define a first schema for use with source video content from the particular content producer, and could define a second schema for use with subtitle content from the particular content producer. Continuing the example, a different content producer could define a different schema for use with their source video content and a different schema for use with their subtitle content, and so on. Once the content provider API 115 confirms that the new content conforms with the corresponding schema, the content provider API 115 stores the validated new content in the content storage system 125 (block 118).

In one embodiment, the content provider API 115 can initiate an operation to store the validated new content in the content storage system 125, but in some instances such an operation (e.g., a download of the new content across a secure Internet channel) can take a significant amount of time to complete. As such, the content provider API 115 can allow one or more other components to subscribe to notifications relating to the new content, and the content provider API 115 can publish a notification to all such subscribers when the copy operation is completed.

The content provider API 115 can initiate an operation with the part provider management system 130 to generate a new part object within the parts catalog 145 for the ingested content (operation 122). The part provider management system 130 contains a processor(s) 132 and a memory 134, which in turn contains a part provider management application 135 and an operating system 142. The part provider management application 135 contains a part creation API 137 and a part provider visibility API 140. In one embodiment, the content provider API 115 initiates the operation 122 by making one or more calls to the part creation API 137 of the part provider management application 135. In a particular embodiment, the part creation API 137 can determine that the storage operation 118 of the new content has not yet completed, and the part creation API 137 can subscribe to notifications relating to the storage of the new content from the content provider API 115.

Upon determining that the new content has been successfully stored within the content storage system 125 (e.g., upon receiving a notification from the content provider API 115), the part creation API 137 can initiate an operation to create a new part object for the parts catalog 145 that represents the new content. In one embodiment, the operation to create the new part object specifies as an input a reference to the storage location of the new content within the content storage system 125, rather than using the raw data of the new content. For example, the part creation API 137 could initiate the new part object creation process using a path to the new content stored in the content storage system 125, rather than the raw data of the new content itself (which could be very large in size).

Once the new part object is built, the part creation API 137 publishes the new part for the new content to the parts catalog 145 (operation 124). Throughout the process of building the new part object, the part provider visibility API 140 can provide one or more exposed functions that can be called (e.g., by the content provider API 115) to determine a status of the part object creation workflow. For example, one of the content provider systems 110 could transmit a status request to the content provider API 115, which in turn could submit a status request to the part provider visibility API 140 of the part provider management application 135. The part provider visibility API 140 could then return a current status of the creation of the new part object, which could in turn be returned by the content provider API 115 to the content provider system 110.

In one embodiment, once the new part has been created and published to the parts catalog 145, the part is made available for consumption by one or more downstream systems or consumers. As used herein, downstream systems or consumers refer to software applications and/or computer systems that are allowed to access the parts catalog 145 to retrieve part objects and their corresponding data. For example, in the event the new part corresponds to new video content (e.g., encoded video data for an episode of a particular show), a downstream consumer such as a digital video streaming service could consume the published new part and its associated information to populate a graphical user interface for the digital streaming service site and even to retrieve video data for transmission to streaming video clients. As another example, a downstream web application server for a web site that features descriptions and other attributes of movies and other video content could consume the part object to extract relevant information for use in populating web pages for the site. More generally, however, any number of different types of downstream consumers can make use of the new part object, consistent with the functionality described herein.

Figure 1B:
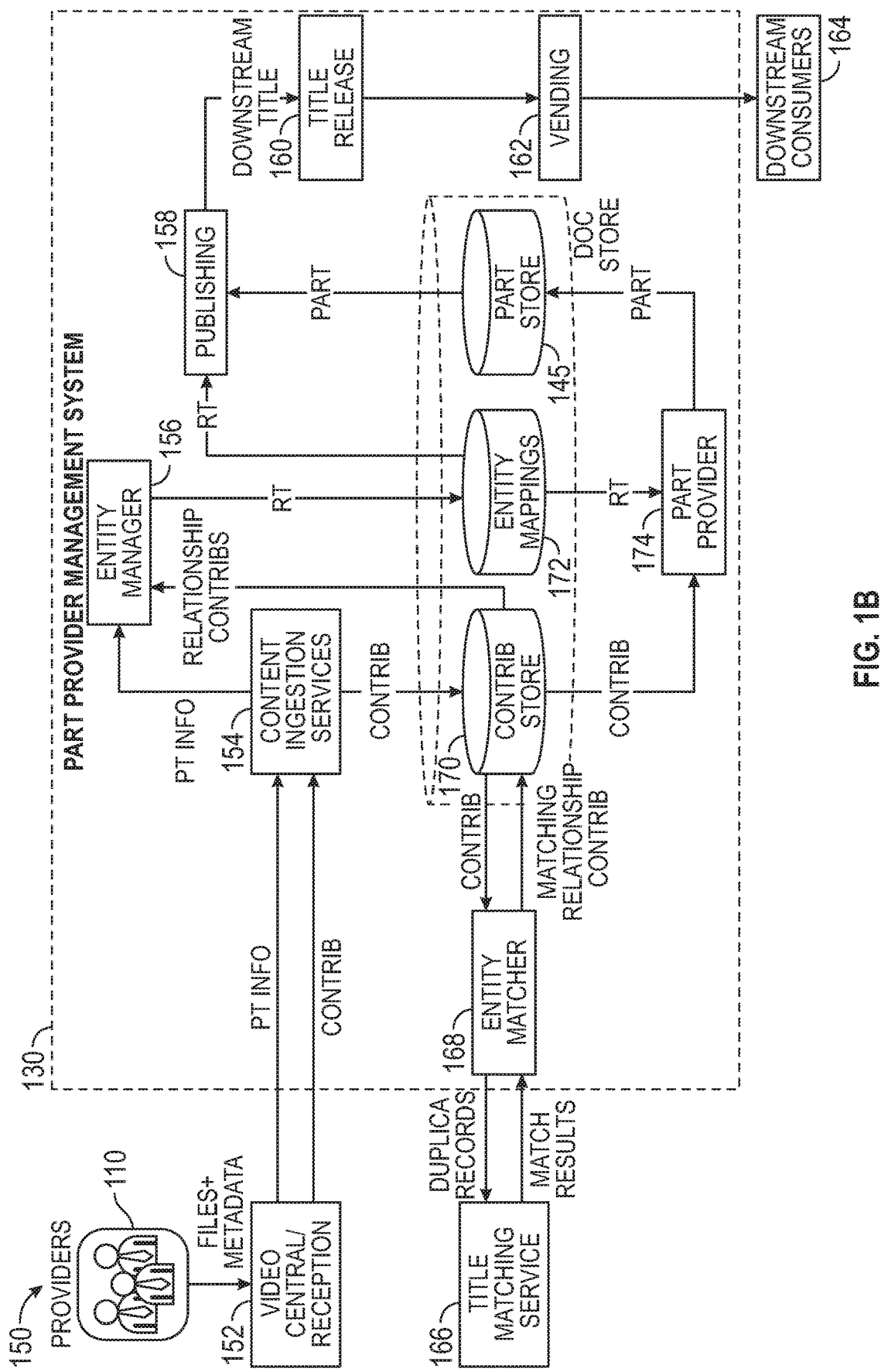

FIG. 1B is a block diagram of a system that includes a part provider management system, according to one embodiment described herein. As shown, the system 150 depicts one more content providers 110 submitting files and associated metadata to a video central/reception service 152. The video central/reception service 152 provides partner title (PT) information and contribution information to the content ingestion services 152. Contribution information can include, without limitation, any information that can influence the distributed catalog, such as rights information, metadata contributions, asset contributions and so on. In one embodiment, the PT represents information that uniquely identifies a given content entity (e.g., an episode of a show, a movie, etc.) within a content provider namespace.

The content ingestion services 154 transmit the PT information to an entity manager component 156. The entity manager component 156 is configured to generate a reconciled title (RT) based on the received PT, and transmits the RT to the entity mappings data store 172. In one embodiment, the RT represents information that uniquely identifies the given content entity corresponding to the PT, within the entity manager namespace. The content ingestion services 154 further transmit the contribution information to the contributions data store 170. The entity manager 156 can then retrieve this contribution information, as well as any related contribution information, from the contributions data store 170.

In the depicted embodiment, an entity matcher component 168 is configured to retrieve the contributions information from the contributions data store 170 and transmits the contributions information to a title matching service 166. Generally, the title matching service 166 is configured to identify entities that correspond to the same title. For example, video data for a particular movie could be submitted multiple times (e.g., by different providers 110), and the entity manager 156 could represent each of these separate submissions with a separate entity. The title matching service 166 could determine that these entities are related with one another based on the contributions information for the entities; for example, the title matching service 166 could determine that two entities are related based on comparing the contributions information for the two entities and identifying similarities in the contributions information. The title matching service 166 can return match results specifying any existing entities that are determined to match the new entity to the entity matcher component 168, and the entity matcher component 168 can store the matching entities and contributions information within the contributions data store 170.

In one embodiment, the title matching service 166 is configured to receive normalized title records belonging to a catalog as inputs. The title matching service 166 can match related title records using machine learning techniques asynchronously, and the title matching service 166 can publish the results as a cluster of related records. In one embodiment, the title matching service 166 can use machine learning techniques to identify records that match together in work and expression levels.

Additionally, a part provider component 174 can retrieve the contributions information from the contributions data store 170 and can retrieve the RT information from the entity mappings data store 172. The part provider component 174 can use the contributions information and RT information to generate a new part object for the content, and the part provider component 174 can store the new part object in the part store 145. The new part object and RT information can be published by the publishing component 158 to a title release component 160. The title release component 160 can further publish the new part object to a vending component 162, and ultimately the new part object can be consumed by the downstream consumers 164.

Figure 2:
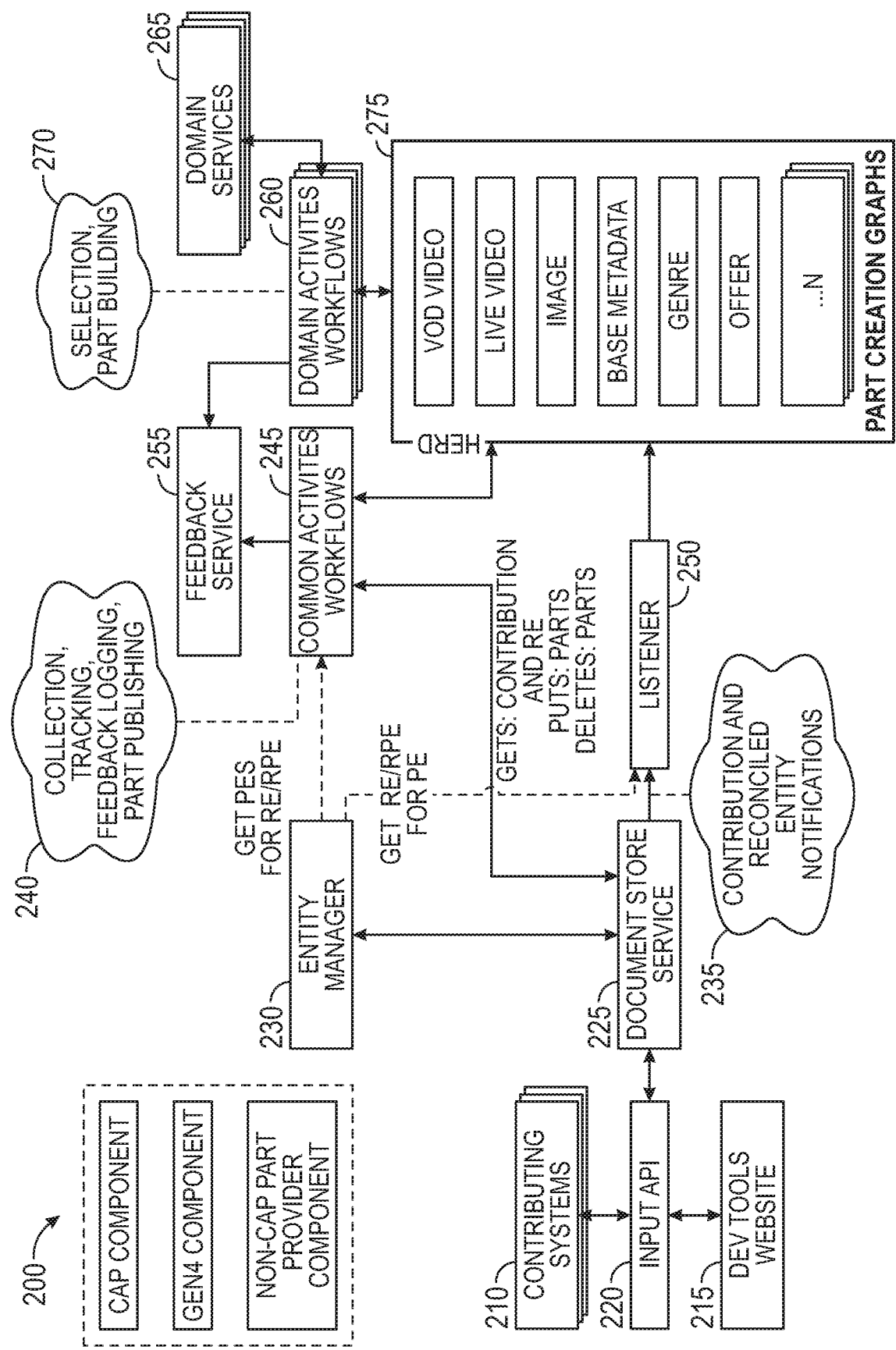
FIG. 2 is a block diagram illustrating components of a part provider management application, according to one embodiment described herein.

FIG. 2 is a block diagram illustrating components of a part provider management application, according to one embodiment described herein. As shown, a plurality of contributing systems 210 can interface with an input API 220 (e.g., the part creation API 137) provided by the part provider management application 135. The Input API 220 in turn interfaces with a Dev Tools Website 215 as well as a Document Store Service 225. The Dev Tools Website 215 can provide operational tooling for users to view and manage contributions objects and related workflows. The Document Store Service 225, in turn, interacts with an Entity Manager 230, a Listener component 250 of the part provider management application 135 and a Common Activities Workflows 245. When interfacing with the Listener component 250, the Document Store Service 225 may publish Contribution and Reconciled Entity notifications 235 to one or more subscribers. The Common Activities Workflows 245 co-manages a plurality of Part Creation Graphs 275, and interfaces with a Feedback Service 255. The Feedback Service 255 interfaces with Domain Activities Workflows 260, which also co-manage the Part Creation Graphs 275 together with the Common Activities Workflows 245 and the Listener 250.

The Domain Activities Workflows 260 interface with Domain Services 265 and engage in selection and part building operations 270.

In the depicted embodiment, the Part Creation Graphs 275 can correspond to a number of different types of content and can define a variety of types of information. For example, as such, the Part Creation Graphs 275 can be used for part generation for Video on Demand (VOD) video, live video, and images, and can define information such as base metadata, genre, offers and so on.

Figure 3A:
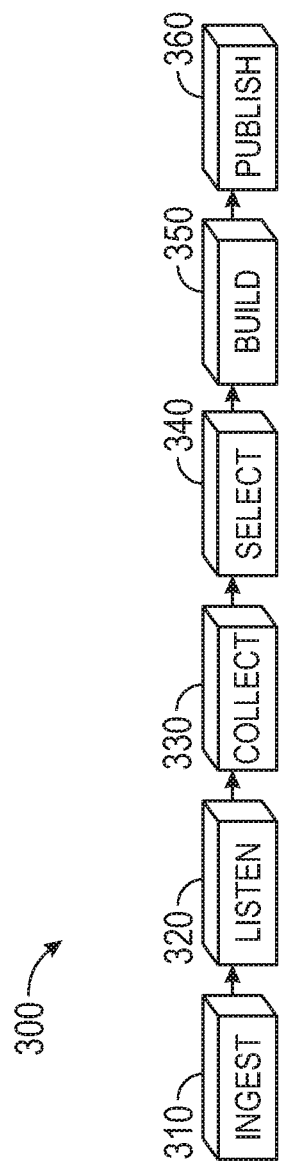
FIGS. 3A-B are workflows for generating new part objects within a parts catalog for a new content entity, according to one embodiment described herein.

In one embodiment, the Content Provider API 115 implements the Ingest stage 310 of the workflow shown in FIG. 3. FIG. 3A is a workflow for generating a new part object within a parts catalog for a new content entity, according to one embodiment described herein. Generally, an entity refers to an abstract concept that represents an entry in the catalog of the part provider management application 135. For example, an entity could be a traditional instance of digital video content (e.g., an episode of a show, a movie, etc.), a live event, a real-world object (e.g., a sports team, a player, etc.) or an aggregation of the above or other entities. One embodiment provides three types of entities: a Partner Entity (PE), a Reconciled Partner Entity (RPE) and a Reconciled Entity (RE).

The Input API 220 can allow upstream contributing systems 210 to create and inspect contributions. In one embodiment, a contribution refers to a set of tightly-coupled, highly-cohesive attributes that are delivered as a unit by a contributor via a contributing system 210. In a particular embodiment, an individual contribution is treated as immutable and is associated with exactly one PE. A PE represents a single Partner's view of an entity, and a PE can encapsulate one external identifier (e.g., a particular alias plus a stock keeping unit (SKU) value, paired with a content identifier). In one embodiment, all contributions recognized by the part provider management application 135 are associated with a PE. In a particular embodiment, two or more different contributing systems 210 may submit to the same PE. Generally, each PE will have one parent RPE value, and can be referenced by a globally-unique PE identifier (PEID) value.

In one embodiment, a RE refers to a node in a customer-facing browse graph (e.g., a television (TV) series, a TV season, a TV episode, a movie, a trailer video, video of a sports tournament, video of a sporting event, video of an event highlight, an actor, an athlete, etc.). In one embodiment, meaningfully-different versions of an entity (e.g., a Director's Cut and a Theatrical Version of the same movie) can be modeled using separate REs. Generally, an RE will have one or more child RPEs and can be referenced using a globally-unique RE identifier (REID) value.

In one embodiment, a RPE represents a rights-centric version of a RE with fundamentally the same video content. In such an embodiment, multiple unique video files can be considered fundamentally the same when the only variations between the video files would not typically be noticed by viewers. In one embodiment, a single RPE may have multiple videos with variations such as different legal bumpers (e.g., a legal warning about the unauthorized copying of video content), content overlays (e.g., no smoking symbols in certain geographic locations), censored scenes (e.g., which can vary, depending on geographic region, nationality and so on) or device-targeting variations (e.g., different aspect ratios). Generally, a RPE will have a single parent RE and one or more child PEs, and an RPE can be referenced by a globally-unique RPE identifier (RPEID) value.

Returning to FIG. 3, the ingestion stage 310 generally encapsulates the operations involved in or closely related to receiving inputs into the pipeline 300. In one embodiment, contributing systems 310, acting on behalf of contributors, can create new PEs and contribution documents by interfacing, directly or indirectly, with one or more APIs (e.g., content provider API 115, part creation API 137, etc.). As discussed above, content provider systems 110 can upload asset files, metadata, and other information, and the content provider API 115 can validate such files and facilitate their storage in the content storage system 125. The content provider API 115 can also provide functions through which the content provider systems 110 can submit corrections for mistakes or provide missing attributes for high priority content.

As discussed above, the content provider systems 110 can interface with the schema management system 120 to define schemas. Additionally, these content provider systems 110 may be empowered to iterate on those schemas to provide new attributes. As discussed above, the content provider API 115 can use such schemas to perform validation for contribution payload syntax during ingestion. Semantic validation that is limited to the contribution document itself (e.g., offer end date is after the start date) can also be defined for specific schemas.

In one embodiment, asset, metadata, and rights contributions use a PEID as the partition key. In such an embodiment, entity relationship contributions can use a concatenated pair of PEIDs. In various other embodiments, contributions may be keyed by REID, RPEID, file URI, contract ID, or other non-PEID values.

Contribution unique IDs may vary across content provider systems 110. In one embodiment, all contributions will include the contributor identity as the prefix, to avoid multiple contributors overwriting each other's contributions for the same PE. In a particular embodiment, contributions can also include the territory string (i.e., a unique value identifying a geographic territory) to, for example, facilitate scalable partitioning in the Collect stage. The ID may also include domain-specific discriminators, e.g., metadata contributions may include locale, assets will include a file Uniform Resource Identifier (URI), and rights contributions can include a type of the offer in question. These domain discriminators may be used when a contributor provides multiple contributions with the same schema and partition key, but different data targeting different sub-elements of the target entity.

In one embodiment, the Ingest stage 310 uses the schema configuration store of the schema management system 120 to decouple content provider systems 110 from internal details of contribution persistence. Each schema can be configured with a Lambda function to transform the contribution payload into the partition key and unique ID. The destination domain and library can also be retrieved from the schema configuration. Such encapsulation allows the contributing system to only provide the payload and contributor identity.

The part provider management application 135 can begin the Listen stage 320 when an input action is taken by a contributing system 210, e.g., a contribution is created, updated, or deleted, or the relationship between a Partner Entity, Reconciled Partner Entity, or Reconciled Entity changes. To determine when such input actions are taken, the part provider management application 135 can subscribe and process many notification queues across multiple domains and libraries. When a notification is received, the part provider management application 135 can resolve the target entity from the triggering notification, query for previously-published parts, and choose the correct domain-specific code path, before proceeding to the Collect stage 330.

Generally, the target entity refers to the RE or RPE for the entity closure that is relevant to this workflow instance. For example, if the target entity is an alias (i.e., not the primary RE or RPE), the part provider management application 135 can determine that there is only a single next step before the workflow is terminated, e.g., a workflow where any existing parts published to the merged entity are deleted. Doing so ensures that downstream systems do not continue to use these parts as they become increasingly out-of-date, versus the parts published to the primary entity.

For primary entities, the part provider management application 135 can avoid race conditions through the use of an optimistic lock. In doing so, the part provider management application 135 can query for all published parts under the target entity and store the version strings for later use in the workflow. The part provider management application 135 can also use the set of territory strings from the parts to ensure they are unpublished, even if all their contributions have been deleted.

Generally, different workflows require different code paths with different owners. For example, an "image language" contribution could be routed to an image part creation code path, while a "genre" contribution could go to a metadata part creation code path. The Listen stage 320 generally encapsulates the configuration involved in such routing. In one embodiment, the Listen stage ends by initiating further processing in the Collect stage 330. Doing so guarantees the execution of at least one workflow that incorporates all contributions for a target entity, regardless of the order of ingestion.

In one embodiment, the Collect stage 330 begins with the part provider management application 135 processing the target entity identifier (RPEID or REID) and the territories of existing parts. Generally, the Collect stage 330 involves collecting all contributions and subdividing them by territory. As part of the Collect stage 330, the part provider management application 135 can next perform a strongly-consistent query against a document store (e.g., content storage system 125). Such a two-stage query can include all contributions in all relevant contribution domains for all PEs under the target entity. In one embodiment, such a query ignores deleted contributions.

One challenge of the Collection stage 330 is scaling to the number of contributions. A single RPE may have only a handful of PEs, but each PE could have thousands of contributions. For example, for a single image, 200 locales, with 10 variations per locale, and 5 attributes per image and 1 contribution per attribute can result in 10,000 different contributions for the single image. The part provider management application 135 can simplify the Collection stage 330 by only collecting contribution references, without collecting the entire payload. In one embodiment, the part provider management application 135 can achieve this while still allowing territory partitioning by requiring the territory be in the contribution ID. After collecting the contributions, the part provider management application 135 in the Collections stage 330 can create a child workflow for each territory with a contribution or a previously-published part. Each child workflow can execute separately during the Select stage 340, Build stage 350 and Publish stage 360.

At the Select stage 340, the part provider management application 135 can determine the subset of contributions for a particular territory that are both consistent and valid. As used herein, a set of contributions is said to be consistent when none of the contributions within the set contain conflicting information, e.g., two contributions specifying two different language attributes for the same image file. As used herein, valid contributions are contributions that pass semantic validation.

Generally, a contribution may contain top-level attributes for the entity, or the contribution could have information about sub-elements that will lead to a more complex part structure. Examples of complex part structures include the list of image assets in an Image Part, or a complex nested playlist in a VOD Video Part. The part provider management application 135 can key the contributions themselves to avoid collisions, e.g., as described in the Ingest stage 310 section. In the Select stage 340, the part provider management application 135 can determine the full set of contributions using the schema-specific unique IDs, and at the Build stage 350 the part provider management application 135 can assemble the full set of contributions into the complex part.

In one embodiment, the part provider management application 135 during the Select stage 340 can simply choose the "best" contribution of each type for the relevant partition. For instance, the part provider management application 135 could initially choose the "best" contribution based on contribution timestamp and contributor trust (e.g., the contribution with the higher trust and latest timestamp wins). As an example, if the part provider management application 135 determines there are two "image language" contributions for the same image file, the part provider management application 135 could choose the contribution with the latest timestamp and the earlier contribution would not be included in the selected set. The part provider management application 135 can also include some level of semantic validation, to ensure the part provider management application 135 ignores invalid contributions even if they are otherwise the "best".

At the Build stage 350, after the part provider management application 135 has selected the ideal subset of contributions for the target entity, the part provider management application 135 can aggregate the data into a Part object. As such, in one embodiment, the Build stage 350 is considered the most domain-specific of any stage in the workflow 300. During the build stage, the part provider management application 135 can perform deep validation (e.g., subtitle drift checks) and call lateral dependencies (e.g., to encode video files, upload images, transform metadata, merge rights and contracts).

Once the Build stage 350 is complete, the part provider management application 135 can write the output of the Build stage 350 to the Document Store, which is represented in the workflow 300 by the Publish stage 360. Once written to the document store, the new part can be discovered and published to customer-facing data stores by, for example, a Title Assembly Service (TAS) or a Catalog Production system. In one embodiment, if the part provider management application 135 determines that a part cannot be built, the part provider management application 135 refrains from publishing a partial or incomplete part to the same library as successful parts. Moreover, in such an embodiment, the part provider management application 135 may not unpublish previously published parts, as such parts represent a successful earlier state of the target entity's contributions. In one embodiment, the part provider management application 135 only unpublishes a part upon determining that the part was generated in error, either from a bug or from all source contributions being deleted.

In one embodiment, when publishing a new part, the part provider management application 135 is configured to account for race conditions. That is, contributions and entities may have changed in the time elapsed since the Listen stage 320, and the part provider management application 135 can protect against this by performing an optimistic write to the Document Store. If the part provider management application 135 determines that the existing part does not have a version that matches the version acquired during the Listen stage 320, the write fails and the workflow 300 restarts. If the part provider management application 135 determines no part existed for a territory when the workflow 300 was initiated, the part provider management application 135 can publish the new part with the CREATE_ONLY flag.

In one embodiment, the part provider management application 135 publishes each part with the REID or REID+RPEID as the partition key and territory as the unique ID. Doing so allows easy lookup by the Listen stage 320 (e.g., for unpublishing) and by downstream systems like TAS and Catalog Production.

Once the workflow 300 is complete and a new part has been published, downstream consumers such as a Title Assembly Service and/or the Catalog Production system can aggregate the part into the target entity's manifest. For example, the Catalog Production can incorporate additional data (that may not be deterministic), such as pricing data or current encoding status. The part provider management application 135 can pass the entity manifest and part payloads to a Catalog Release service for cross-part validation. In one embodiment, the cross-part validation process is where cross-domain checks occur during the workflow 300. Finally, the part provider management application 135 can make the parts available to Catalog Distribution for vending to downstream clients.

Figure 3B:
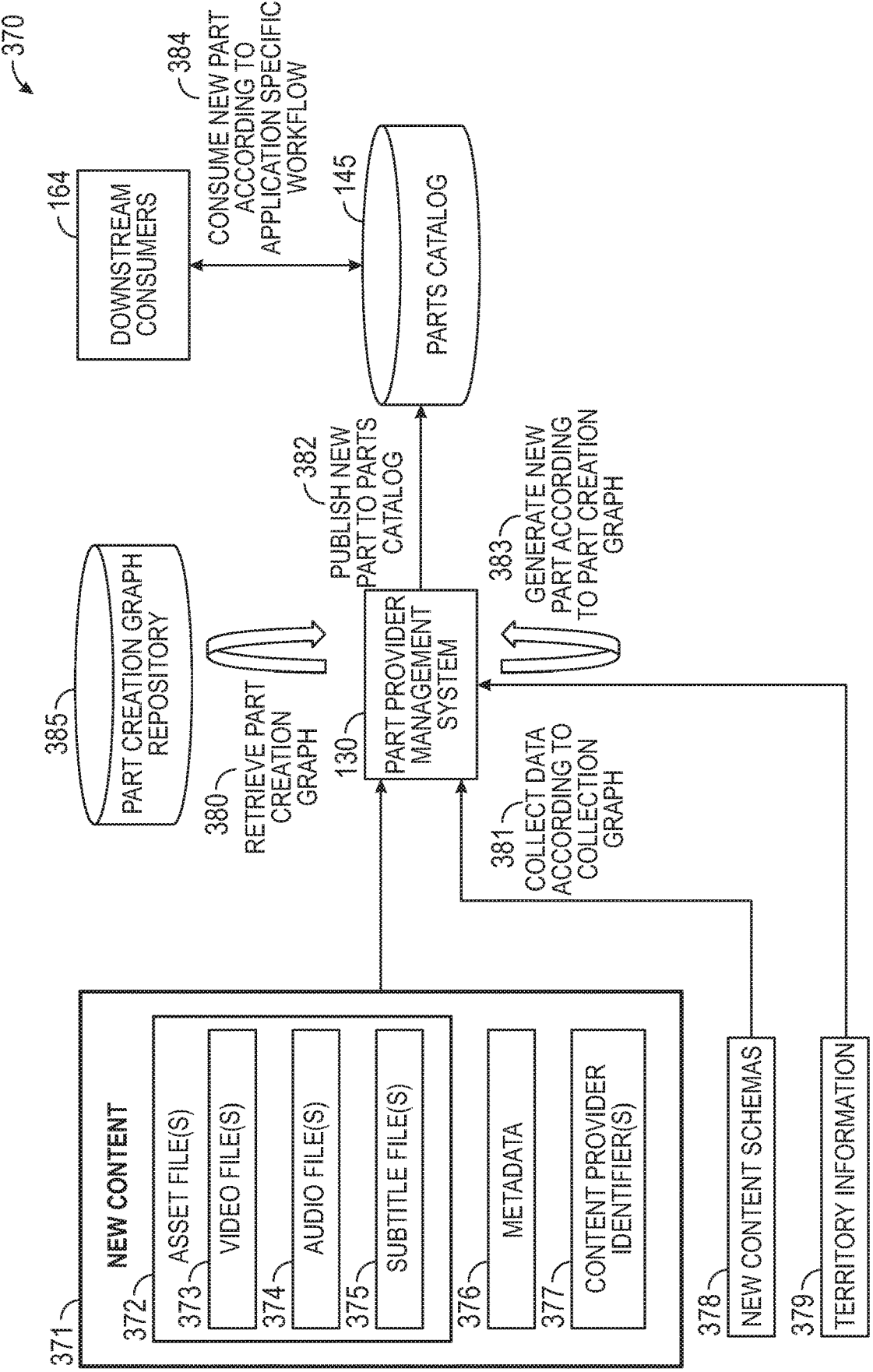

FIG. 3B is a workflow for generating a new part object within a parts catalog for a new content entity, according to one embodiment described herein. As shown, the workflow 370 begins, where the part provider management system 130 performs an operation to collect data according to a collection graph (operation 381). In the depicted embodiment, the part provider management system 130 collects a piece of new content 310, together with content schemas 378 corresponding to the new content and territory information 379 corresponding to the new content. As shown, the new content 371 can include asset file(s) 372, which include video file(s) 373, audio file(s) 374 and subtitle file(s) 375, as well as associated metadata 376 and content provider identifier(s) 377. Of note, the depicted data types are shown for illustrative purposes only and without limitation, and more generally any suitable types of data can be ingested by the part provider management system 130, consistent with the functionality described herein.

Upon collecting the data, the part provider management system 130 retrieves a part creation graph from the part creation graph repository 385 (operation 380). The part provider management system 130 then uses the retrieved part creation graph to generate a new part from the collected data (operation 383). The part provider management system 130 publishes the new part to the parts catalog (operation 382). As discussed above, prior to publishing the new part and making it available for the downstream consumers 164, the part provider management system 130 can perform one or more validation operations on the new part to ensure the part's validity. Once the part in the parts catalog 145 is made available to the downstream consumers 164, the downstream consumers 164 can consume the new part according to their own application-specific workflow (operation 384).

For example, a video streaming service downstream consumer 164 could consume the new part to facilitate the streaming of video data to client devices. As another example, a web application server could consume the new part and could use the information within the part to populate one or more web pages to be served to client devices.

Figure 4:
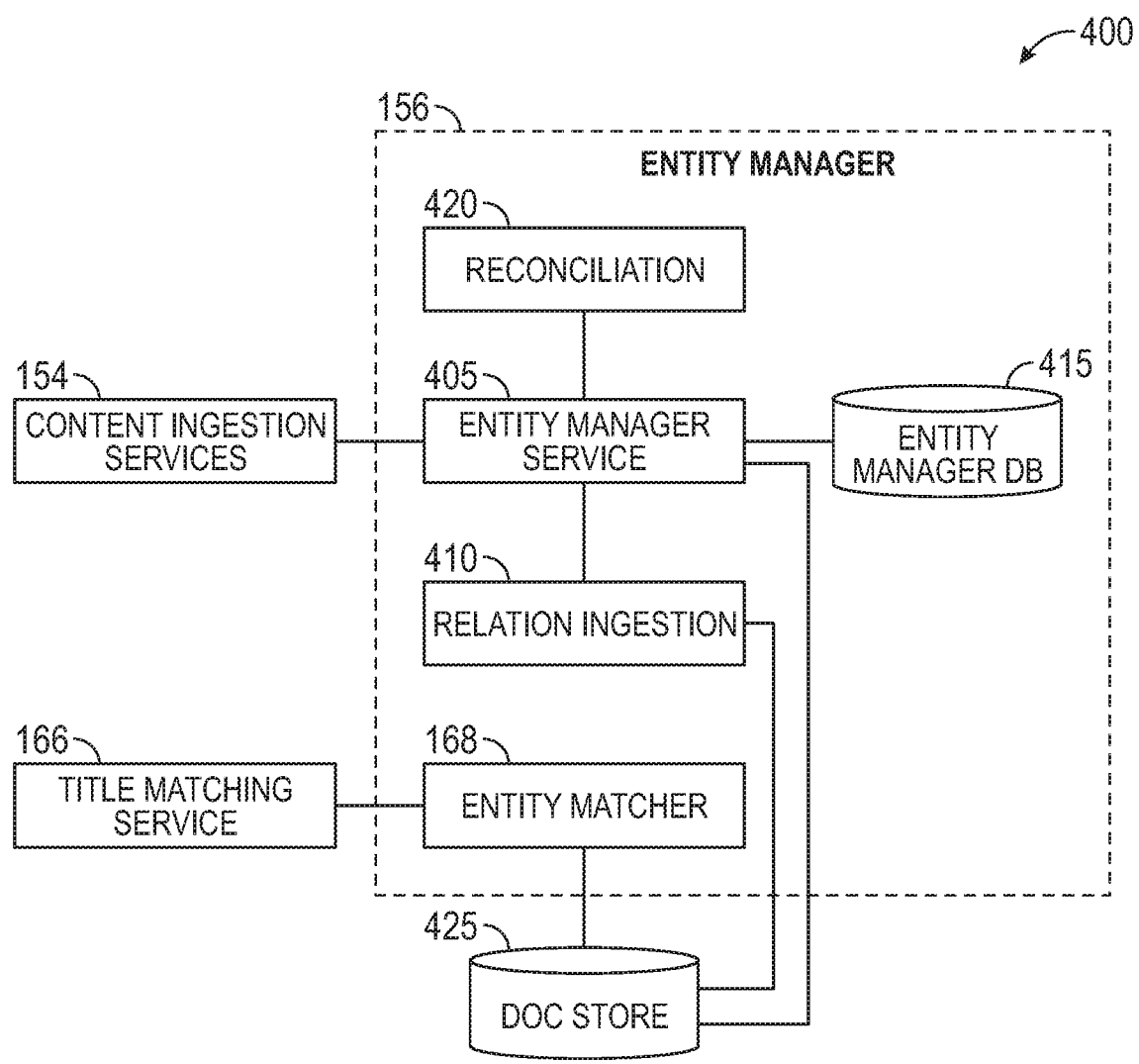
FIG. 4 is a block diagram illustrating an entity management system, according to one embodiment described herein.

FIG. 4 is a block diagram illustrating an entity management system, according to one embodiment described herein. As shown, the system 400 includes the content ingestion services 154, which are configured to provide an API through which content providers can submit new content for ingestion. The content ingestion services 154 can forward a request to ingest new content to an entity manager service 405. Generally, the entity manager service 405 is configured to generate a new entity corresponding to the new content and to store information describing the new entity within the entity manager database 415.

As discussed above, the entity matcher component 168 can transmit entity data and metadata to the title matching service 166, and the title matching service 166 can return information identifying relationships between entities. For example, the title matching service 166 could determine that two content items are related, when the content items both represent the same movie but submitted from different content providers 110. The entity matcher component 168 can receive the information identifying the relationships between entities from the title matching service 166, and could store this relationship information within the document store 425.

Additionally, the entity manager service 405 can transmit the new content and related metadata to a relation ingestion component 410. The relation ingestion component 410 can determine when the related metadata for the new content identifies a relationship with one or more existing entities, and the relation ingestion component 410 can store data representing such a relationship within the document store 425.

In the depicted embodiment, the entity manager service 405 for the entity manager system 156 can transmit new content and related metadata to a reconciliation component 420 for processing. In one embodiment, the reconciliation component 420 is responsible for merging or splitting a title within the entity management namespace. For example, the reconciliation component 420 can perform a merging operation by creating "merged to" links between REs/RPEs and linking REs and PEs to create merged REs or RPEs. Likewise, the reconciliation component 420 could perform a split operation by deleting "merged to" links between REs/RPEs and unlinking the REs and PEs within a merged RE or RPE.

Figure 5:
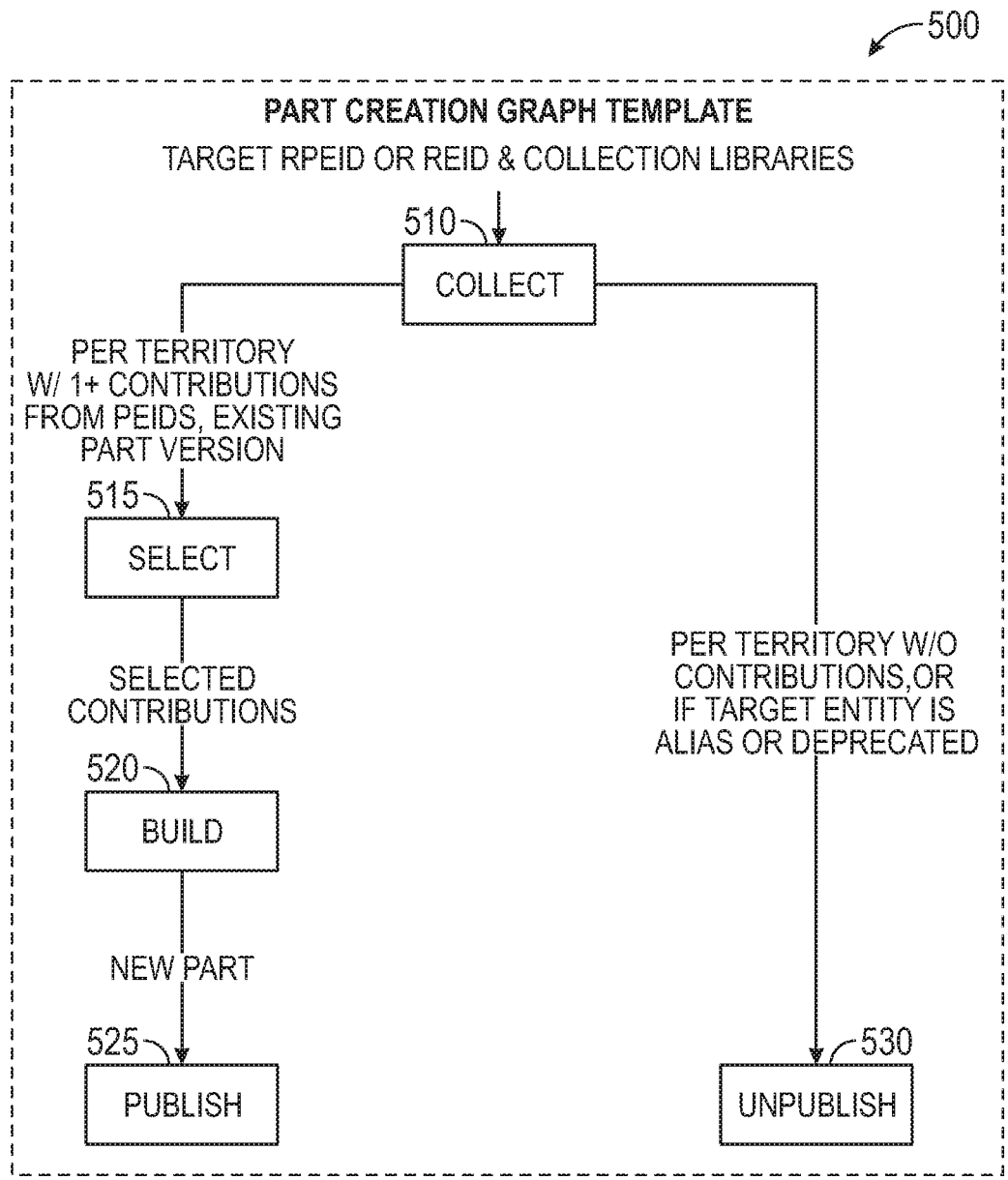
FIG. 5 illustrates an exemplary part creation graph template, according to one embodiment described herein.

As discussed above, the part provider management system 130 can use a part creation graph to generate a new part. Generally, part creation graphs can be used to coordinate the Collect stage 330, Select stage 340, Build stage 350 and Publish stage 360 of the workflow 300. In one embodiment, at least some part creation graphs are configured to publish territory-specific parts using child graphs and work items. FIG. 5 illustrates an exemplary part creation graph template, according to one embodiment described herein. As shown, the part creation graph template 500 begins with a collection stage 510, where the part provider management system 130 reads territories and versions of currently-published parts under the target entity. In one embodiment, the part provider management system 130 acquires an optimistic write lock on the target entity. The part provider management system 130 can query an Entity Manager component for all PEIDs under the target entity. The part provider management system 130 can perform a strongly-consistent read of all active contributions for the determined PEIDs, to read all libraries passed in as an input to the work item. The output of the Collect stage 330 can be a list of all determined contributions, partitioned by territory.

At the Select stage 515, the part provider management system 130 can select activities that will reduce the set of collected contributions and resolve any outstanding conflicts. In doing so, the part provider management system 130 can determine that only the latest version of contributions should be used. After the Select stage 515, the part provider management system 130 at the Build stage 520 can create a Part object from the final set of selected contributions. If the part provider management system 130 determines there are any ambiguities in the contributions, the part provider management system 130 can fail the Build stage 520 and transmit one or more determined issues to a Feedback Service. At the Publish stage 525, the part provider management system 130 updates the part store with the newly generated Part object. In one embodiment, the part provider management system 130 is configured to use a version of a child workflow acquired during the Collect stage 510, together with the new Part object from the Build stage 520, for each territory child workflow. In select instances, e.g., where a territory has no contributions or a target entity is aliased or deprecated, the part provider management system 130 can perform an unpublish operation 530 to unpublish one or more parts from the part store.

Figure 6:
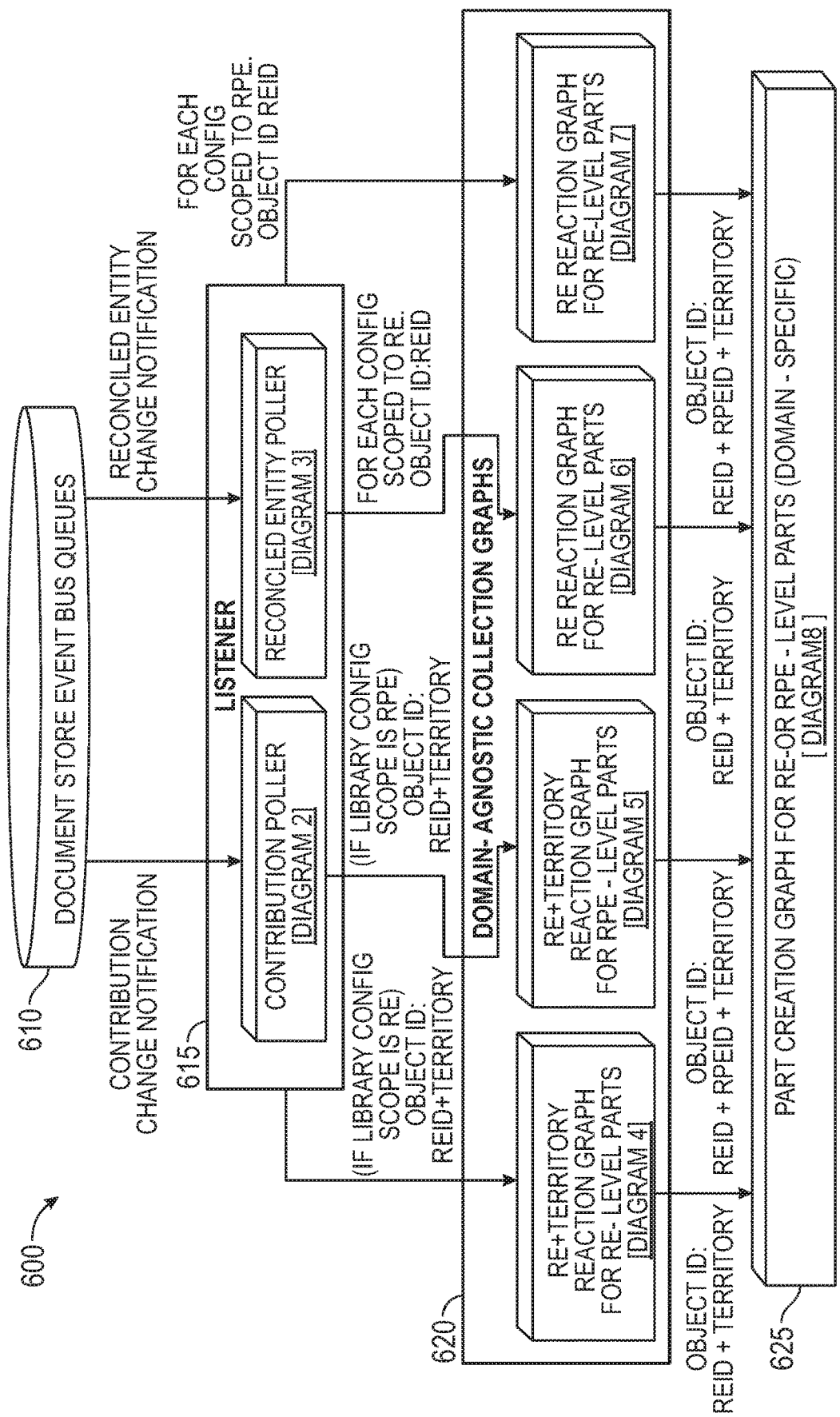
FIG. 6 is a flow diagram illustrating a work flow for generating a new part for a parts catalog, according to one embodiment described herein.

In a particular embodiment, at a high level, the part provider management system 130 is configured to use two conceptual polling components and five types of graphs. An example of this is shown in FIG. 6, which is a flow diagram illustrating a work flow for generating a new part for a parts catalog, according to one embodiment described herein. As shown, the part provider management application 135 at the Listen stage 320 can subscribe to Document Store EventBus Queues 610 in order to receive contribution change notifications and RE change notifications. Specifically, in the illustrated embodiment, a set of poller components 615 of the part provider management application 135 subscribe to these notifications, with a contribution poller component subscribing to contribution change notifications and a RE poller component subscribing to RE change notifications.

The part provider management application 135 in the depicted embodiment is configured with a number of domain-agnostic collection graphs 620 for processing the notifications received by the set of poller component 615. These domain-agnostic collection graphs include, without limitation, a RE+Territory Reaction Graph for RE-level parts, a RE+Territory Reaction Graph for RPE-level parts, a RE Reaction Graph for RE-level parts and a RE Reaction Graph for RPE-level parts. More generally, however, these examples are provided for illustrative purposes only and without limitation. At operation 625, the part provider management application 135 then uses a part creation graph for RE- or RPE-level parts to generate parts objects for the relevant territories, with the parts objects having Object IDs that are determined depending on their corresponding domain-agnostic collection graph 620. For example, in the depicted example, parts objects generated based on the RE+Territory Reaction Graph for RE-level parts would have an object ID calculated by combining the associated REID and the territory identifier.

Figure 7:
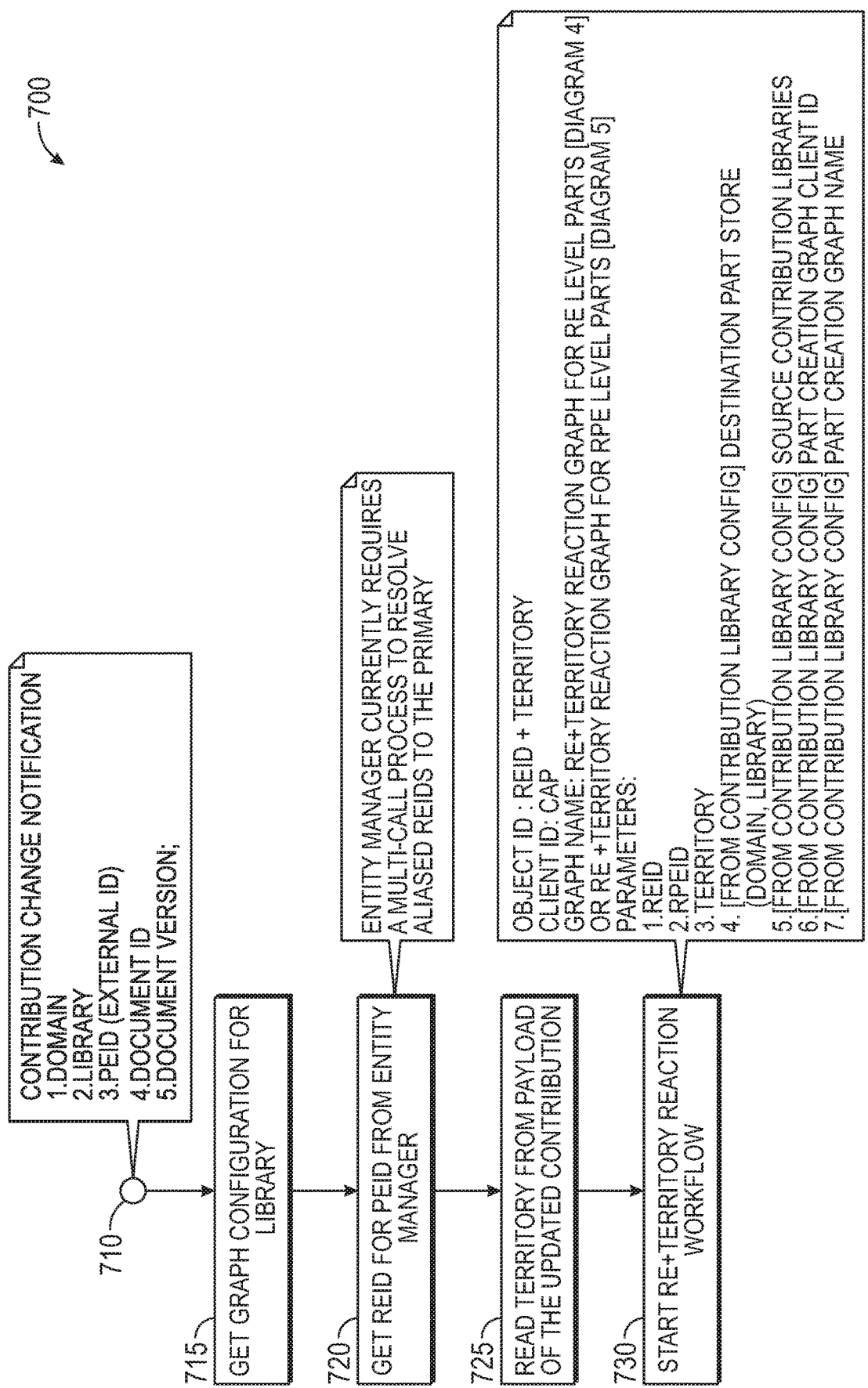
FIG. 7 illustrates a reaction graph for processing contribution change notifications, according to one embodiment described herein.

FIG. 7 illustrates a reaction graph for processing contribution change notifications, according to one embodiment described herein. As shown, the illustrated workflow 700 begins, where the part provider management application 135 receives a contribution change notification specifying a Domain, a Library, a PEID, a Document ID and a Document Version. The part provider management application 135 retrieves graph configuration information for the library (block 715) and retrieves the REID corresponding to the PEID from an Entity Manager component (block 720). The part provider management application 135 reads territory information from payload data of the updated contribution (block 725) and initiates a RE+Territory workflow (block 730). In initiating the RE+Territory workflow, the part provider management application 135 can place a mutually exclusive lock on the RE+Territory, to ensure that only one workflow is running at a time for the RE+Territory. If the part provider management application 135 determines that the RE+Territory is already locked when the part provider management application 135 attempts to initiate the RE+Territory workflow at block 730, the part provider management application 135 can refrain from initiating the workflow at that point in time and can schedule to initiate the RE+Territory workflow at a subsequent point in time (e.g., at a time a predefined period of time after a current time). At the subsequent point in time, the part provider management application 135 could again attempt to initiate the RE+Territory workflow (i.e., if the RE+Territory is unlocked, the part provider management application 135 will place a mutually exclusive lock on the RE+Territory and proceed with executing the workflow).

Figure 8:
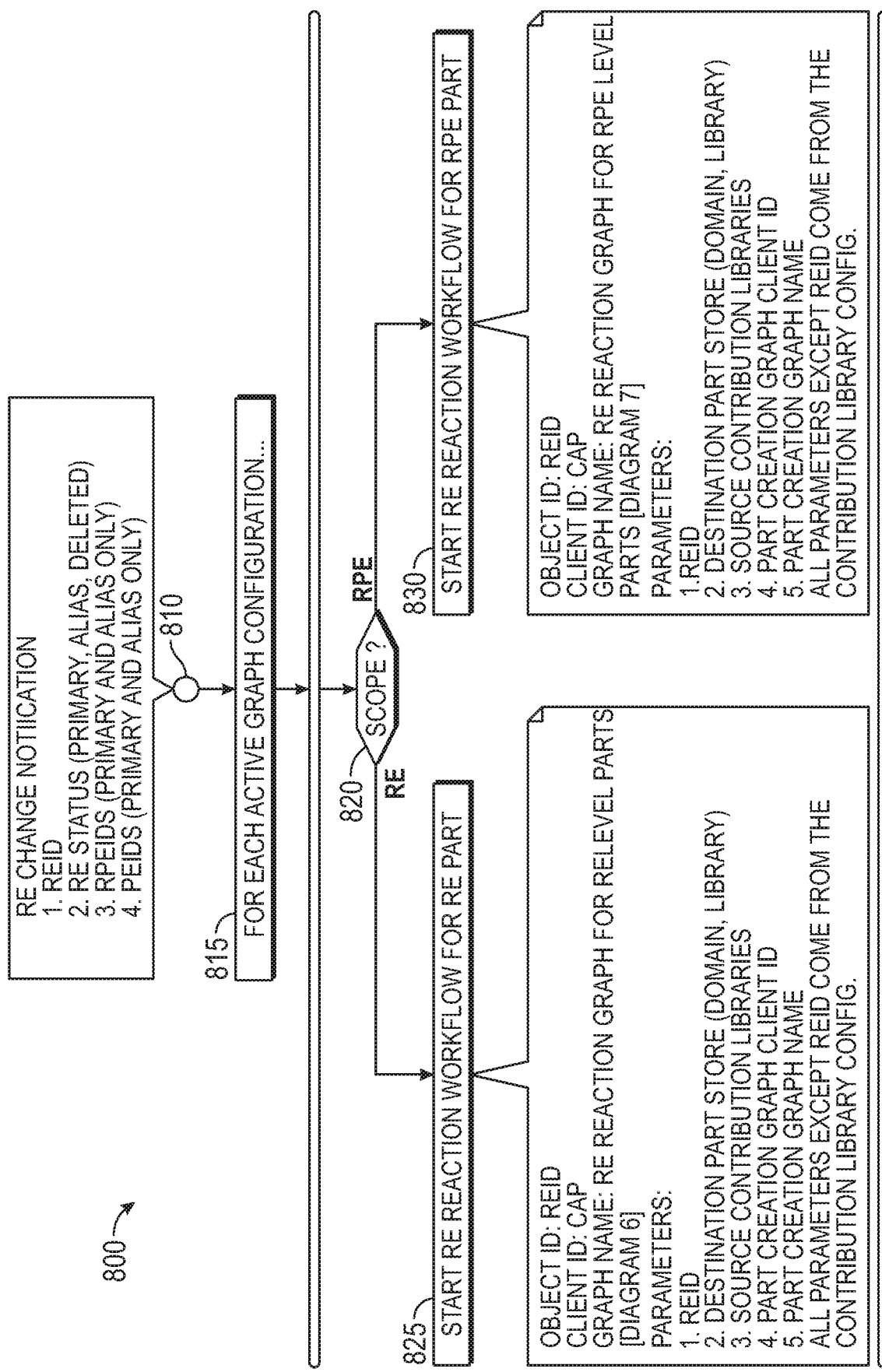
FIG. 8 illustrates a reaction graph for processing reconciled entity change notifications, according to one embodiment described herein.

FIG. 8 illustrates a reaction graph for processing reconciled entity change notifications, according to one embodiment described herein. As shown, the workflow 800 begins, where the part provider management application 135 receives a RE change notification specifying a REID, a RE status (e.g., primary, alias, deleted, etc.), one or more REPIDs and one or more PEIDs. As discussed above, the entity manager component 156 can manage entity objects and can perform merge and split operations on such entity objects. For example, where the entity manager component 156 determines that two separate entity objects refer to the same title (e.g., a particular movie), the entity manager component 156 could perform a merge operation to combine the two entity objects. In doing so, the entity manager component 156 can define a relationship between the entity objects and can update the RE status of the entity objects, based on the relationship. For example, in doing so, the entity manager component 156 could designate one of the entity objects as a "primary" status, and the other could be defined as an "alias" status with a pointer to the "primary" object. In one embodiment, the part provider management application 135 is configured to publish a part object only for the "primary" entity object, as opposed to, e.g., publishing separate part object for each of the two entity objects.

The workflow 800 then enters a loop at block 815, where the part provider management application 135, for each active graph configuration, determines a scope of the RE change notification (block 820). In the depicted embodiment, if the part provider management application 135 determines that the scope of the change is at the RE level, the part provider management application 135 starts a RE Reaction Workflow for an RE Part (block 825). On the other hand, if the part provider management application 135 determines that the scope of the change is at the RPE level, the part provider management application 135 starts a RE Reaction Workflow for an RPE Part (block 830).

Figure 9:
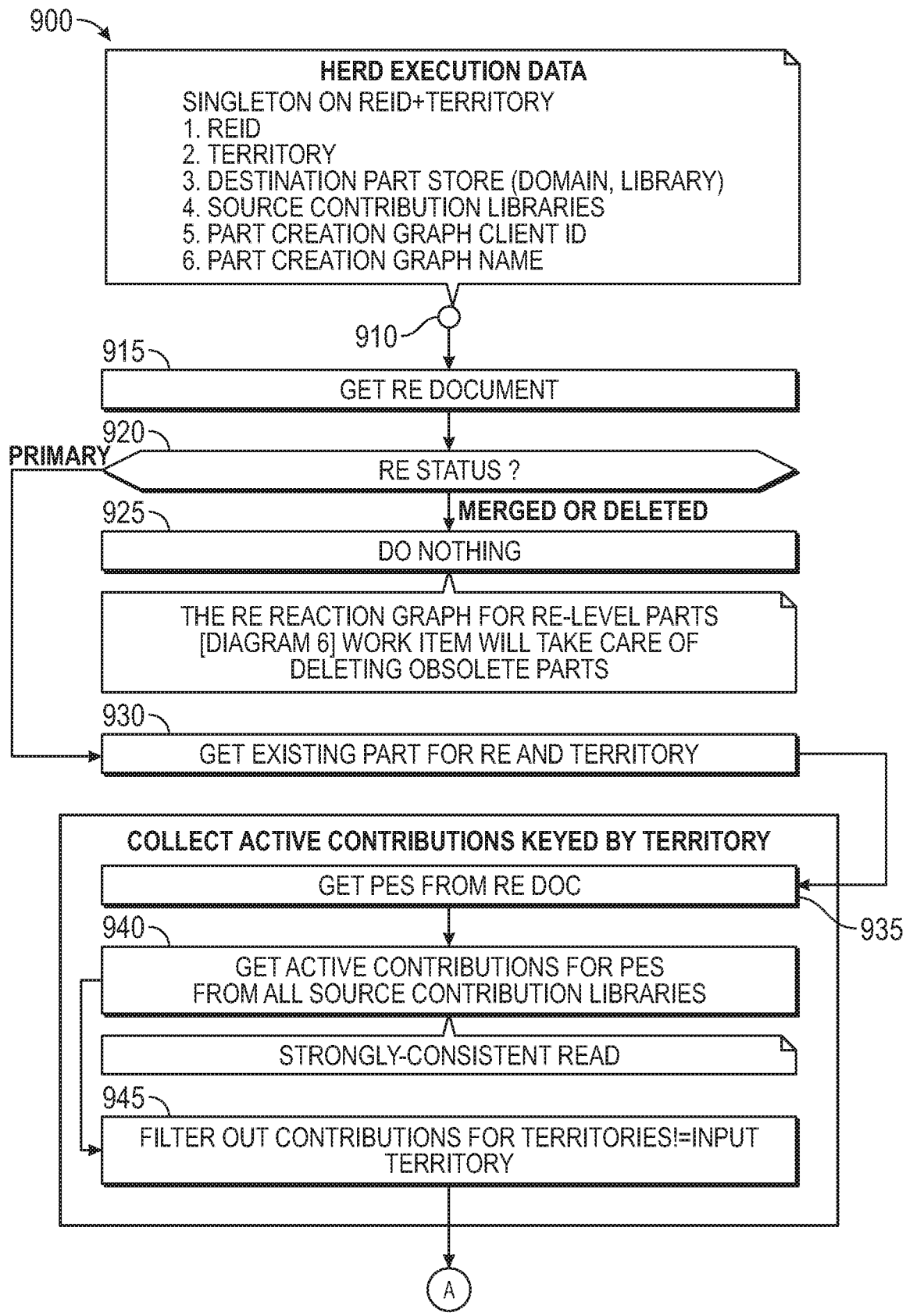
FIG. 9 illustrates a domain-agnostic reaction graph for collecting contributions and starting a single work item for a contribution's reconciled entity and territory, according to one embodiment described herein.
Figure 9:
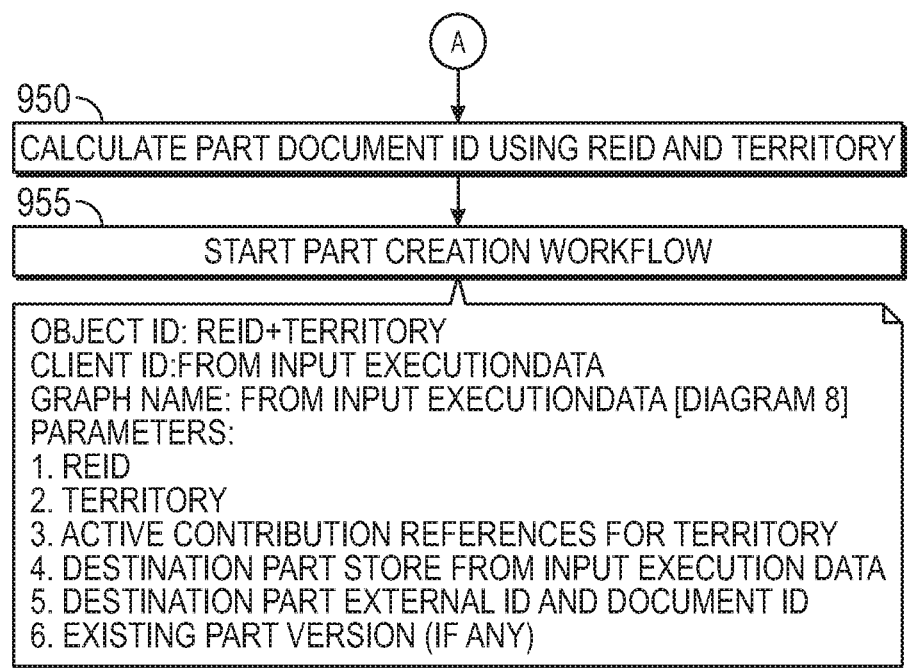

FIG. 9 illustrates a domain-agnostic reaction graph for collecting contributions and starting a single work item for a contribution's reconciled entity and territory, according to one embodiment described herein. As shown, the workflow 900 begins at operation 910, where the part provider management application 135 receives workflow orchestration engine execution data. Such workflow orchestration engine execution data includes a REID, a territory identifier, a destination part store designator, one or more source contribution libraries, a part creation graph client identifier and a part creation graph name.

The part provider management application 135 retrieves a RE document (block 915) and determines a status of the RE document (block 920). If the part provider management application 135 determines the RE document has been merged or deleted, the part provider management application 135 takes no further action (block 925). On the other hand, if the part provider management application 135 determines the status is primary, the part provider management application 135 gets an existing part for the RE and territory from the parts catalog. The part provider management application 135 then performs an operation to collect active contributions keyed by territory, where the part provider management application 135 first retrieves PEs from the RE document (block 935). The uses a strongly-consistent read operation and retrieves active contributions for PEs from all source contribution libraries (block 940). The part provider management application 135 filters out any contributions for territories that do not match the input territory received at block 910 (block 945).

Once the active contributions are collected, the part provider management application 135 calculates a Part Document ID using the REID and territory identifier (block 950). The part provider management application 135 then initiates a part creation workflow (block 955) and the workflow 900 ends. As discussed above, the part provider management application 135 can execute the part creation workflow to generate a new part object for the part catalog. For example, if no part object corresponding to the updated or new content currently exists within the part store, the part provider management application 135 could create a new part object for the new content. As another example, if a part object corresponding to the content currently exists within the part store, the part provider management application 135 could create a new version for the existing part object.

Figure 10:
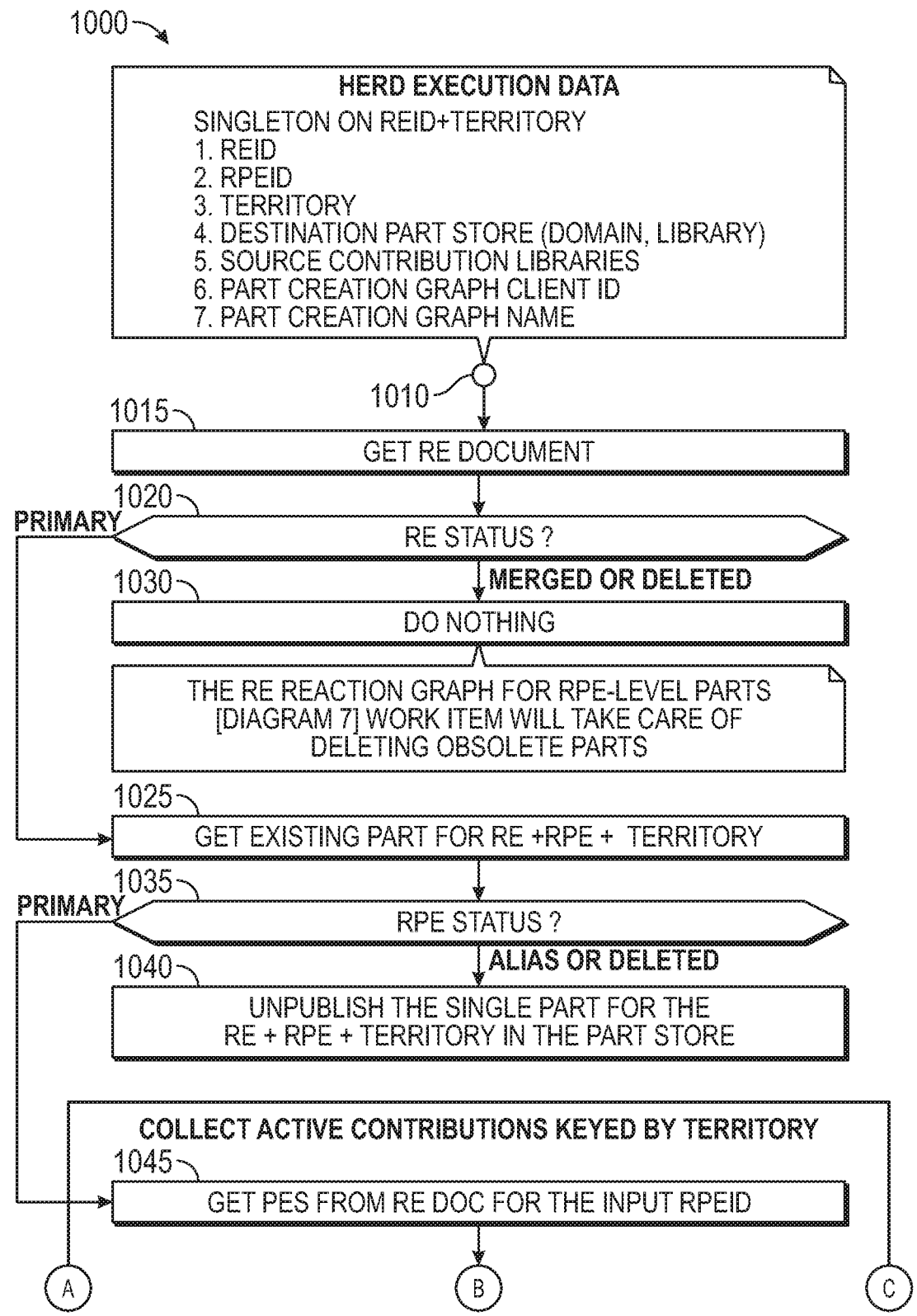
FIG. 10 illustrates a domain-agnostic reaction graph for collecting contributions and starting a single work item for a contribution's reconciled partner entity and territory, according to one embodiment described herein.
Figure 10:
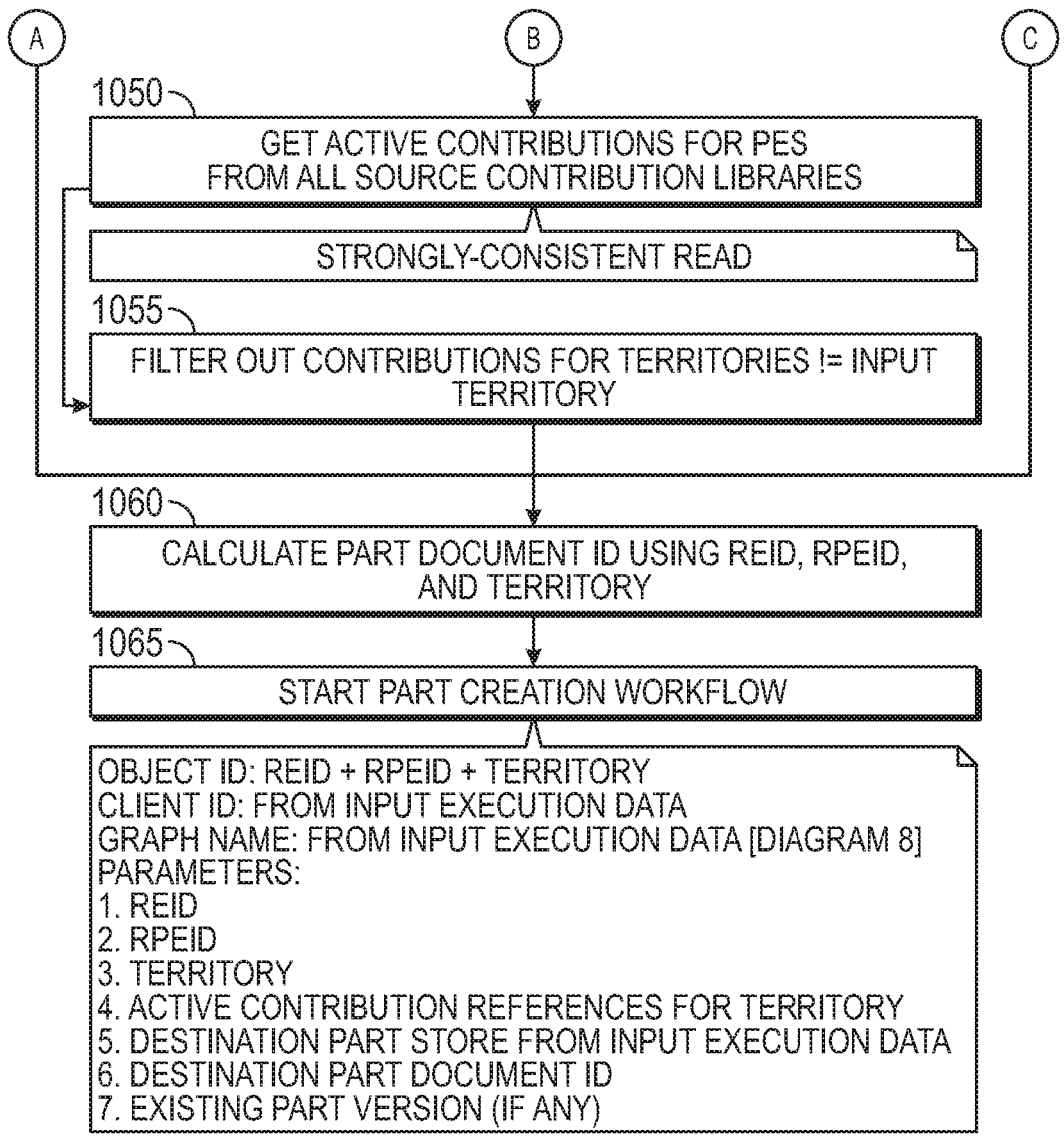

FIG. 10 illustrates a domain-agnostic reaction graph for collecting contributions and starting a single work item for a contribution's reconciled partner entity and territory, according to one embodiment described herein. As shown, the workflow 1000 begins at block 910, where the part provider management application 135 receives workflow orchestration engine execution data. Such workflow orchestration engine execution data includes a REID, a RPEID, a territory identifier, a destination part store, a source contribution library, a part creation graph client ID and a part creation graph name. The part provider management application 135 retrieves a RE document (block 1015) and determines a status of the RE document (block 1020). If the part provider management application 135 determines the RE document has been merged or deleted, the part provider management application 135 takes no further action (block 1030). On the other hand, if the part provider management application 135 determines the status is primary, the part provider management application 135 gets an existing part for the RE, RPE and territory from the parts catalog (block 1025).

The part provider management application 135 then initiates a workflow to collect active contributions keyed by territory, where the part provider management application 135 retrieves PEs from the RE document for the input RPEID (block 1045). The part provider management application 135 then uses a strongly-consistent read operation to get active contributions for PEs from all source contribution libraries (block 1050). The part provider management application 135 filters out any contributions whose territory identifiers do not match the input territory identifier (block 1055).

The part provider management application 135 calculates the part object identifier using the REID, RPEID and territory identifier (block 1060). The part provider management application 135 then initiates a part creation workflow (block 1065), and the workflow 1000 ends. For instance, in the depicted embodiment, the part creation workflow takes as input parameters the REID, RPEID, and territory of the new content, as well as one or more active contribution references for the territory, destination part store information, destination part document identification information and a designation of an existing part version (if any) of a corresponding part object already within the parts catalog.

Figure 11:
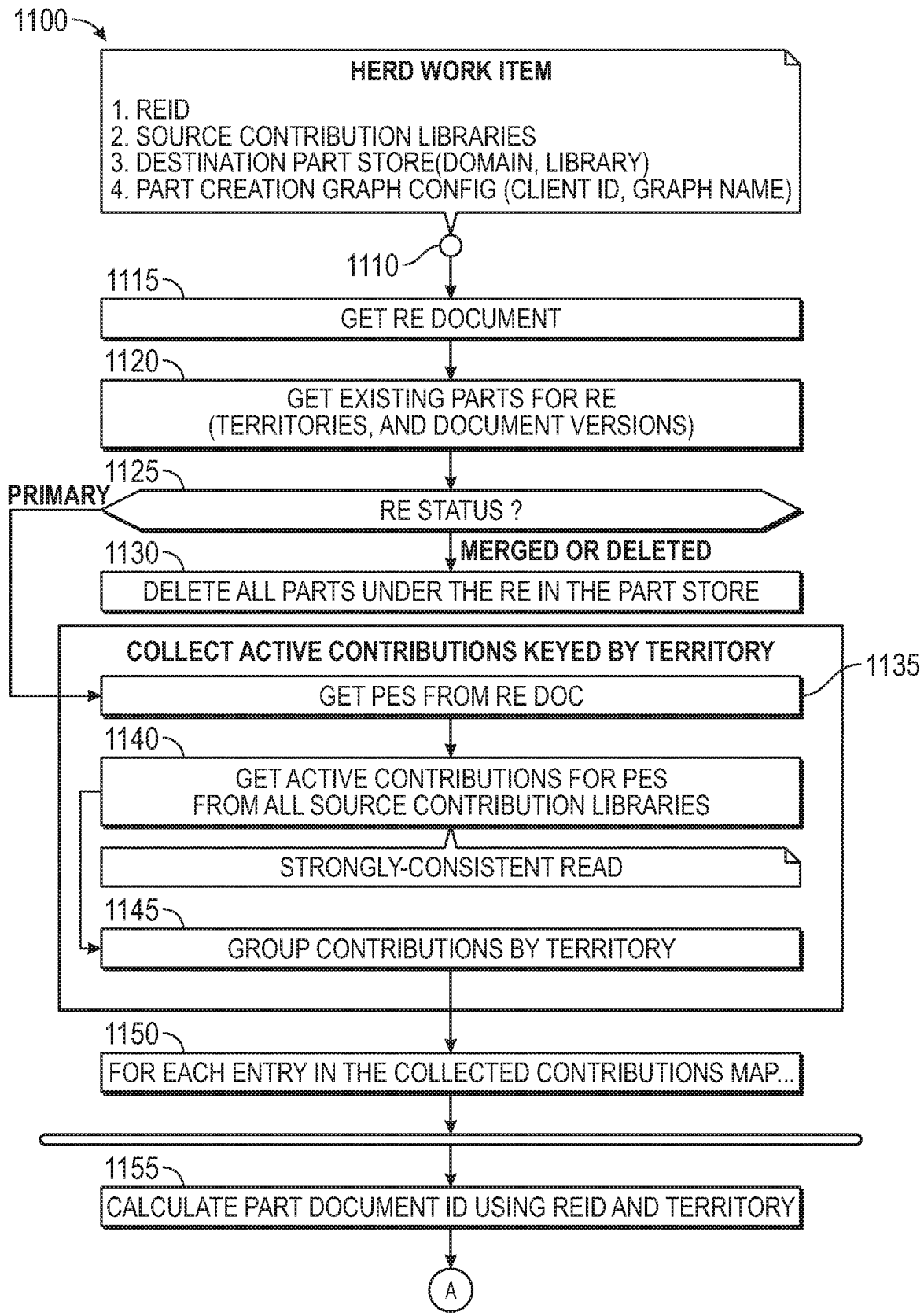
FIG. 11 illustrates a domain-agnostic graph for collecting contributions and starting work items in appropriate territories, according to one embodiment described herein.
Figure 11:
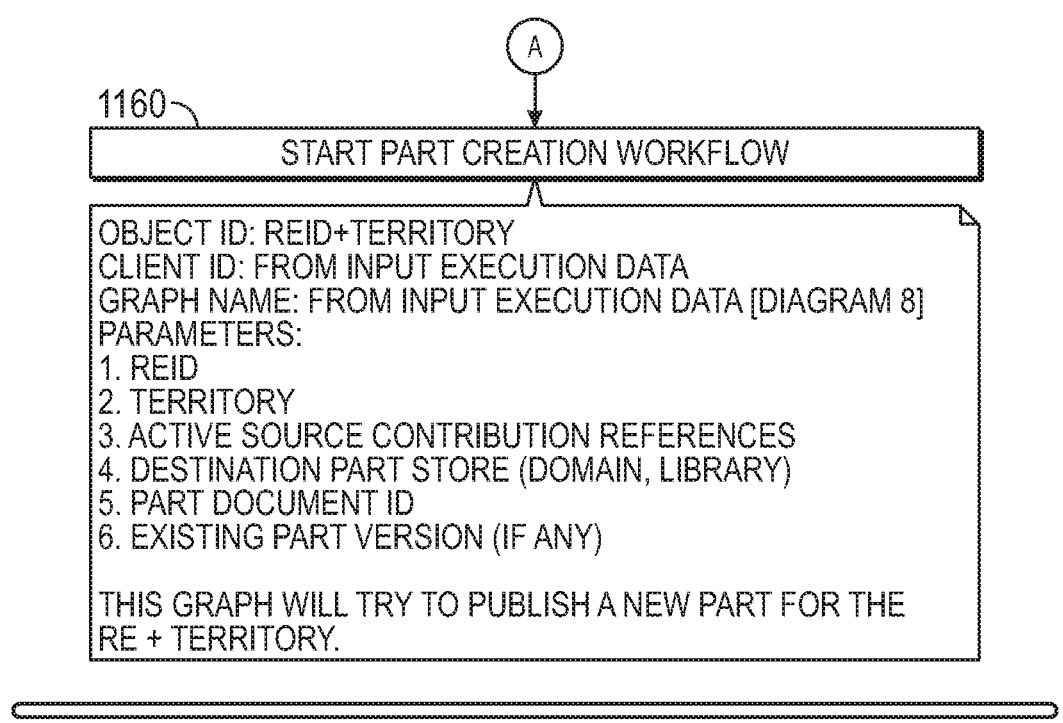

FIG. 11 illustrates a domain-agnostic graph for collecting contributions and starting work items in appropriate territories, according to one embodiment described herein. The operation 1100 begins at block 1110, where the part provider management application 135 receives a workflow execution engine work item specifying a REID, a source contribution library, a destination part store and a part creation graph configuration. The part provider management application 135 retrieves a RE document (block 1115) and gets any existing part objects from the part store (or part catalog) for the RE (block 1120).

The part provider management application 135 determines the RE status at block 1125, and if the part provider management application 135 determines the status is merged or deleted, the part provider management application 135 deletes all parts under the RE in the part store (block 1130). On the other hand, if the part provider management application 135 determines the RE status is primary, the part provider management application 135 initiates a workflow to collect active contributions keyed by territory. In doing so, the part provider management application 135 gets PEs from the RE doc (block 1135) and gets active contributions for PEs from all source contribution libraries using a strongly-consistent read operation (block 1140). The part provider management application 135 groups contributions by territory (block 1145).

Once the active contributions are collected, the part provider management application 135, for each entry in the collected contributions map (block 1150), calculates a part document identifier using the REID and territory (block 1155). The part provider management application 135 then initiates a part creation workflow (block 1160), and the workflow 1100 ends. In the depicted embodiment, the part provider management application 135 initiates the part creation workflow using the REID, territory information, active source contribution reference(s), part document ID and existing part version (if any) as input parameters to the part creation workflow.

Figure 12:
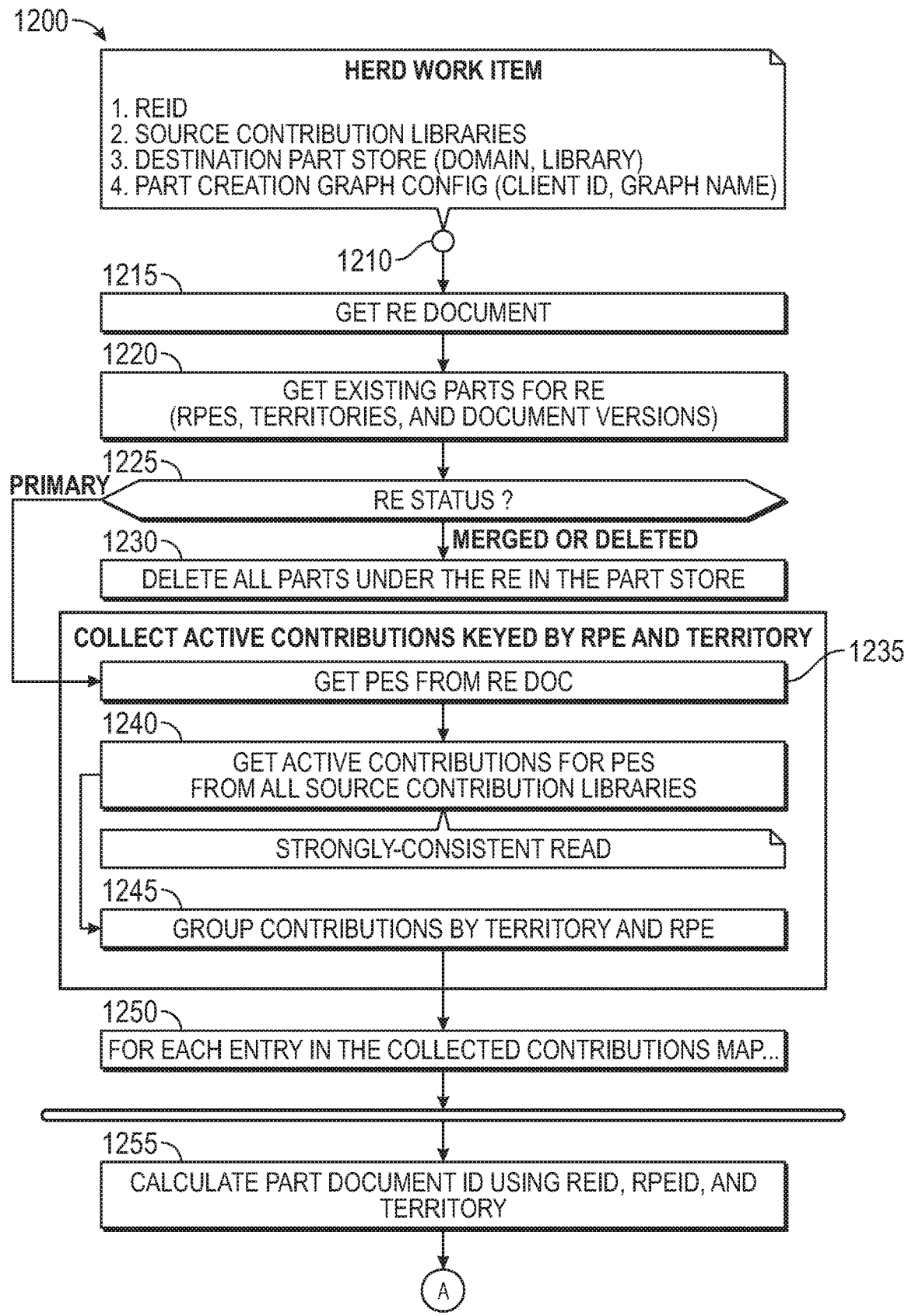
FIG. 12 illustrates a domain-agnostic graph for collecting contributions and starting work items for appropriate territories and deleting existing parts for reconciled partner entities and territories that are no longer associated with the reconciled entity, according to one embodiment described herein.
Figure 12:
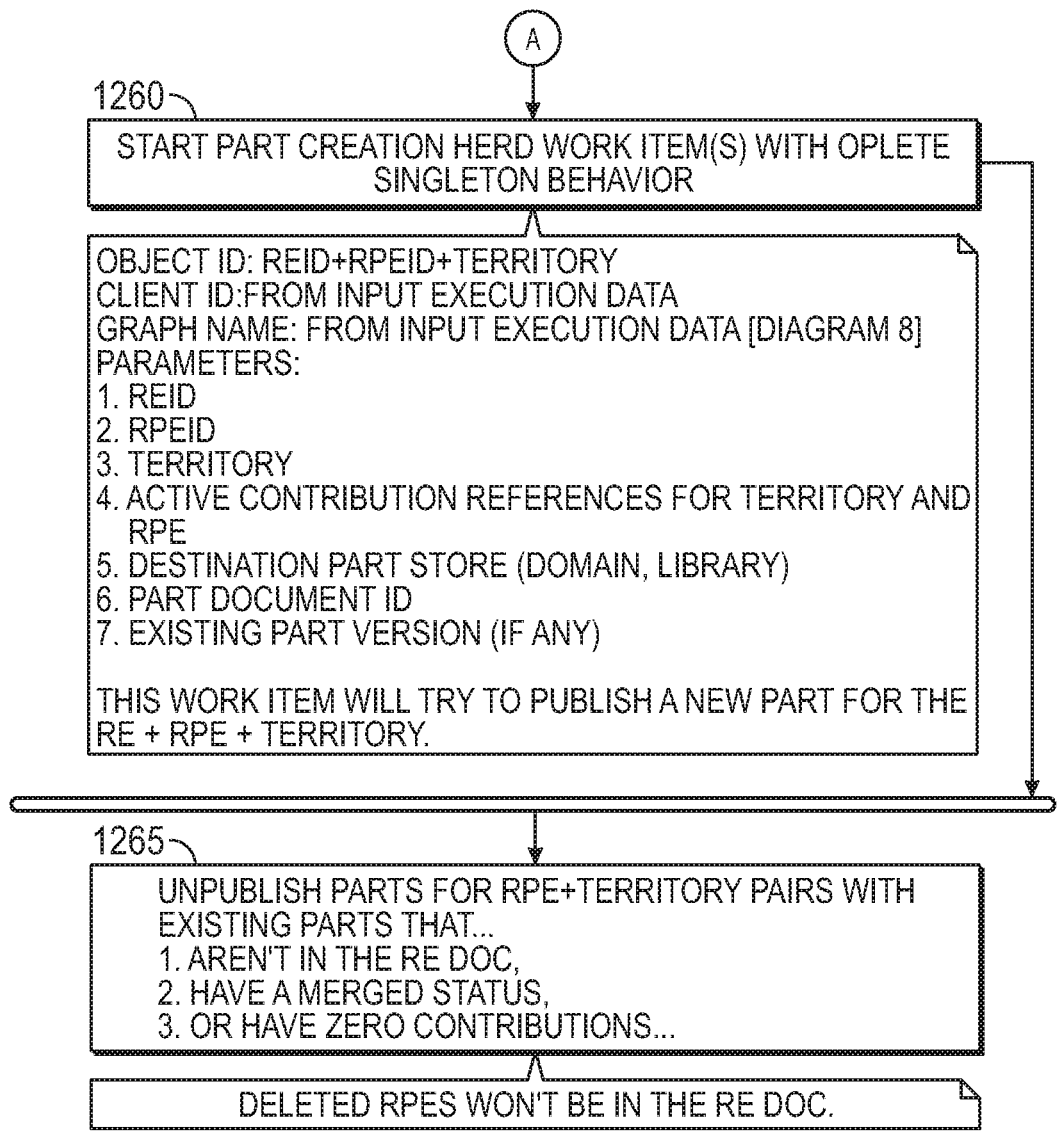

FIG. 12 illustrates a domain-agnostic graph for collecting contributions and starting work items for appropriate territories and deleting existing parts for reconciled partner entities and territories that are no longer associated with the reconciled entity, according to one embodiment described herein. As shown, the workflow 1200 begins at block 1210, where the part provider management application 135 receives a workflow orchestration engine work item specifying a REID, a source contribution library, a destination part store and a part creation graph configuration. The part provider management application 135 retrieves a RE document (block 1215) and retrieves any existing part objects from the part store (or part catalog) for the RE (block 1220).

The part provider management application 135 determines the RE status at block 1225, and if the part provider management application 135 determines the status is merged or deleted, the part provider management application 135 deletes all parts under the RE in the part store (block 1230). On the other hand, if the part provider management application 135 determines the RE status is primary, the part provider management application 135 initiates a workflow to collect active contributions keyed by territory. In doing so, the part provider management application 135 gets PEs from the RE doc (block 1235) and gets active contributions for PEs from all source contribution libraries using a strongly-consistent read operation (block 1240). The part provider management application 135 groups contributions by territory (block 1245).

The part provider management application 135 then enters a loop at block 1250, where for each entry in the collected contributions map, the part provider management application 135 calculated a part document identifier using the REID, RPEID and territory identifier (block 1255). The part provider management application 135 initiates a part creation workflow (block 1260). The part provider management application 135 unpublishes parts for the RPE and territory pairs with existing pairs that (i) are not in the RE document, (ii) have a merged status, or (iii) have zero contributions (block 1265), and the workflow 1200 ends.

Figure 13:
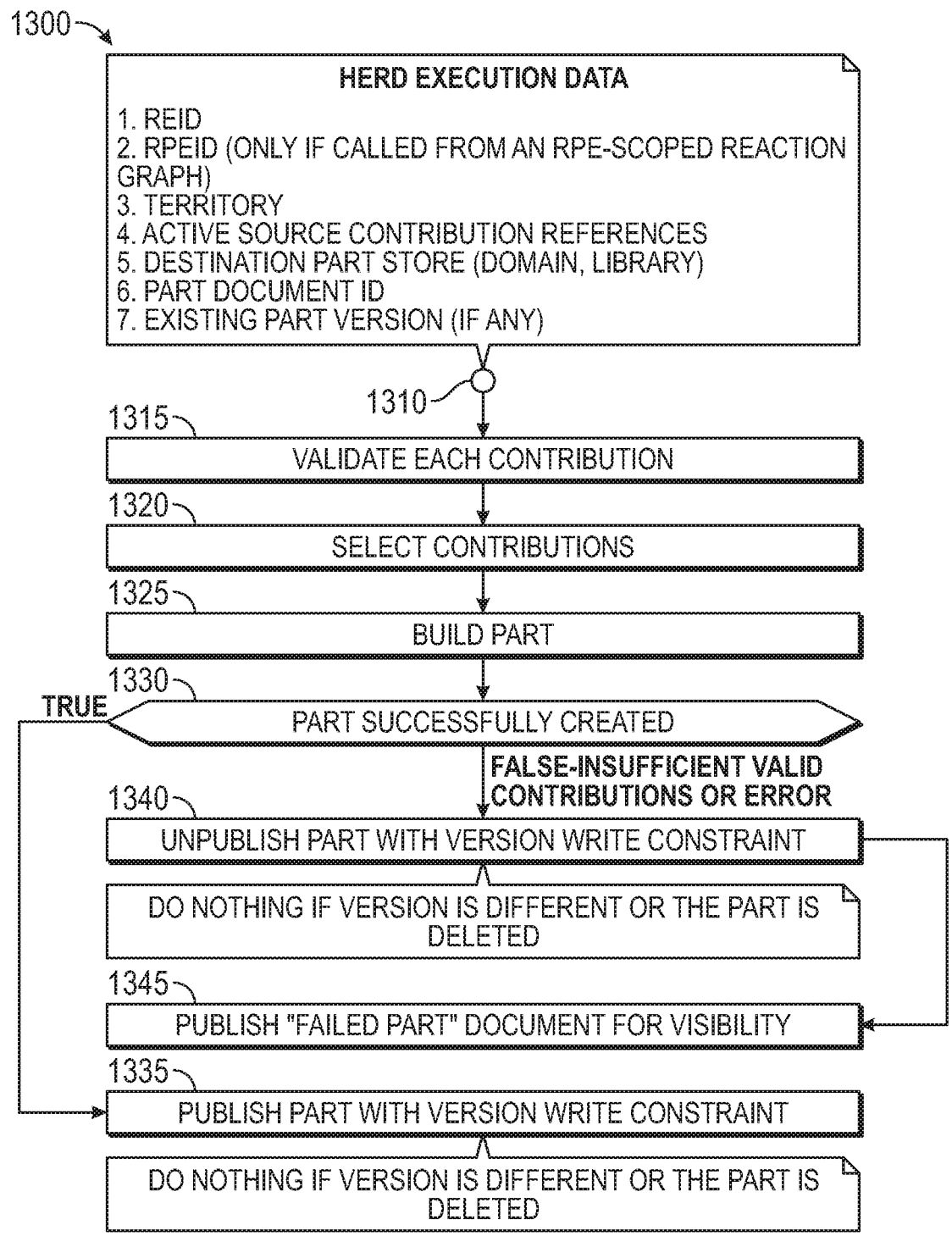
FIG. 13 illustrates a part creation graph, according to one embodiment described herein.

FIG. 13 illustrates a part creation graph, according to one embodiment described herein. The workflow 1300 begins at block 1310, where the part provider management application 135 receives workflow orchestration engine execution data including a REID, a RPEID, a territory identifier, active source contribution references, a destination part store, a part document ID, and an existing part version (if any). The part provider management application 135 validates each contribution corresponding to the active source contribution references (block 1315) and selects a subset of contributions for use in building a part object (block 1320). The part provider management application 135 then builds the part object using the selected contributions (block 1325). At the decision block 1330, the part provider management application 135 determines whether the part was created successfully, and if so, the part provider management application 135 publishes the part with a version write constraint to the parts catalog (block 1335). If the part was not created successfully (e.g., insufficient valid contributions or an error occurred), the part provider management application 135 unpublishes the part from the parts catalog with a version write constraint (block 1340). At block 1345, the part provider management application 135 publishes the "failed part" document for visibility purposes only (e.g., to effectively log the unsuccessful part creation), and the workflow 1300 ends.

Figure 14:
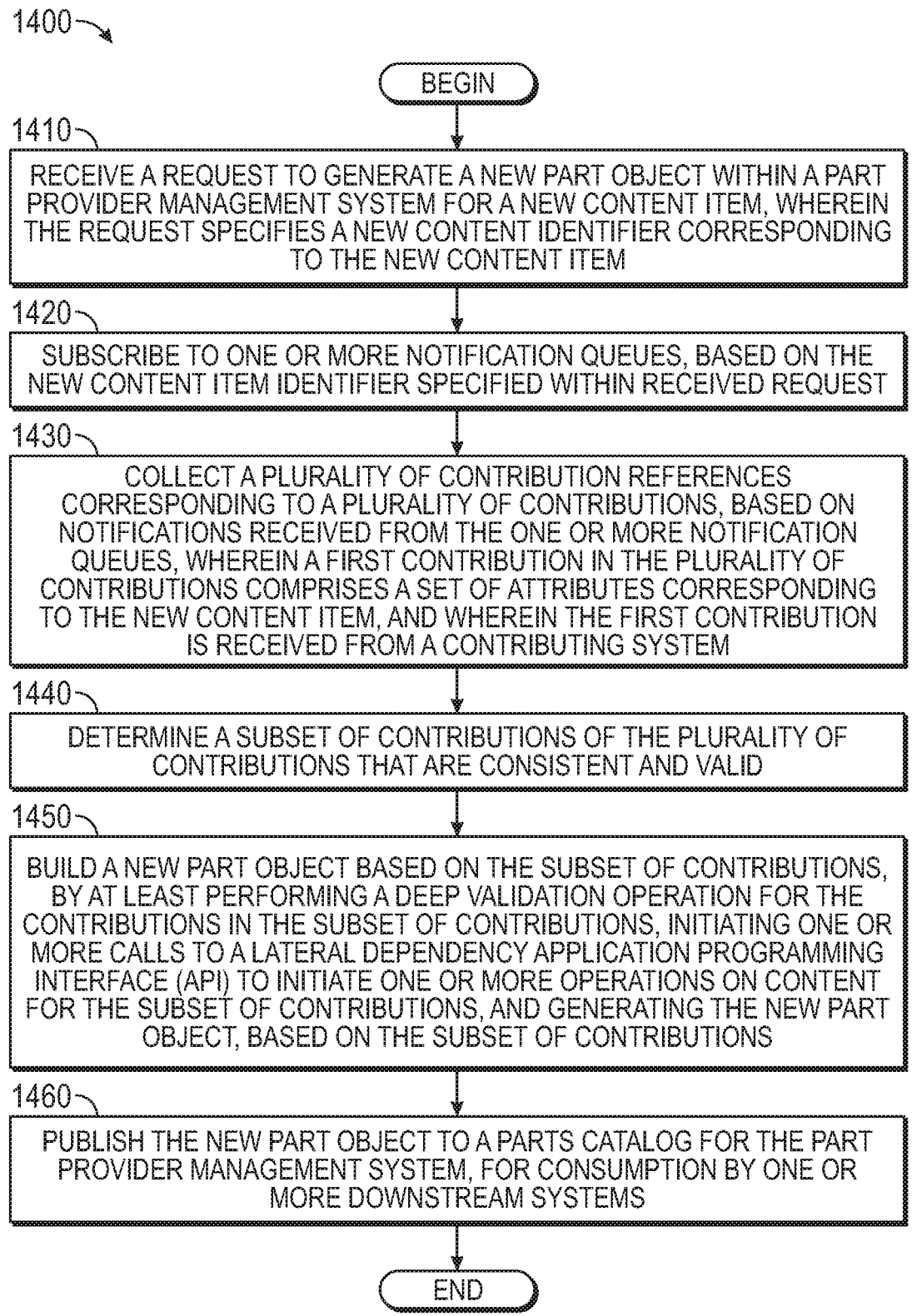
FIG. 14 is a flow diagram, illustrating a method for building and publishing a new part object, according to one embodiment described herein.

FIG. 14 is a flow diagram, illustrating a method for publishing a part to a parts catalog, according to one embodiment described herein. As shown, the method 1400 begins at block 1410, where a schema management system 120 receives, from a contributing system, a request to register a new schema or schema version with a schema management system. Upon successfully performing a validation operation for the new schema or schema version, the schema management system 120 stores the new schema or schema version at the schema management system (block 1420). The content provider API 115 receives a submission of new content for ingestion (block 1430). Upon successfully validating the new content using the new schema or schema version stored at the schema management system, the content provider API 115 stores the new content at a content storage system (block 1440).

The content provider API 115 initiates a workflow with the part provider management application 135 to ingest the new content item into a part provider management system as a new part object (block 1450). The part provider management application 135 collects a plurality of contribution references corresponding to a plurality of contributions, wherein a first contribution in the plurality of contributions comprises a set of attributes corresponding to the new content item (block 1460). The part provider management application 135 builds the new part object based on a subset of contributions from the plurality of contributions (block 1470). The part provider management application 135 then publishes the new part object to a parts catalog for the part provider management system, for consumption by one or more downstream systems, and the method 1400 ends.

Figure 15:
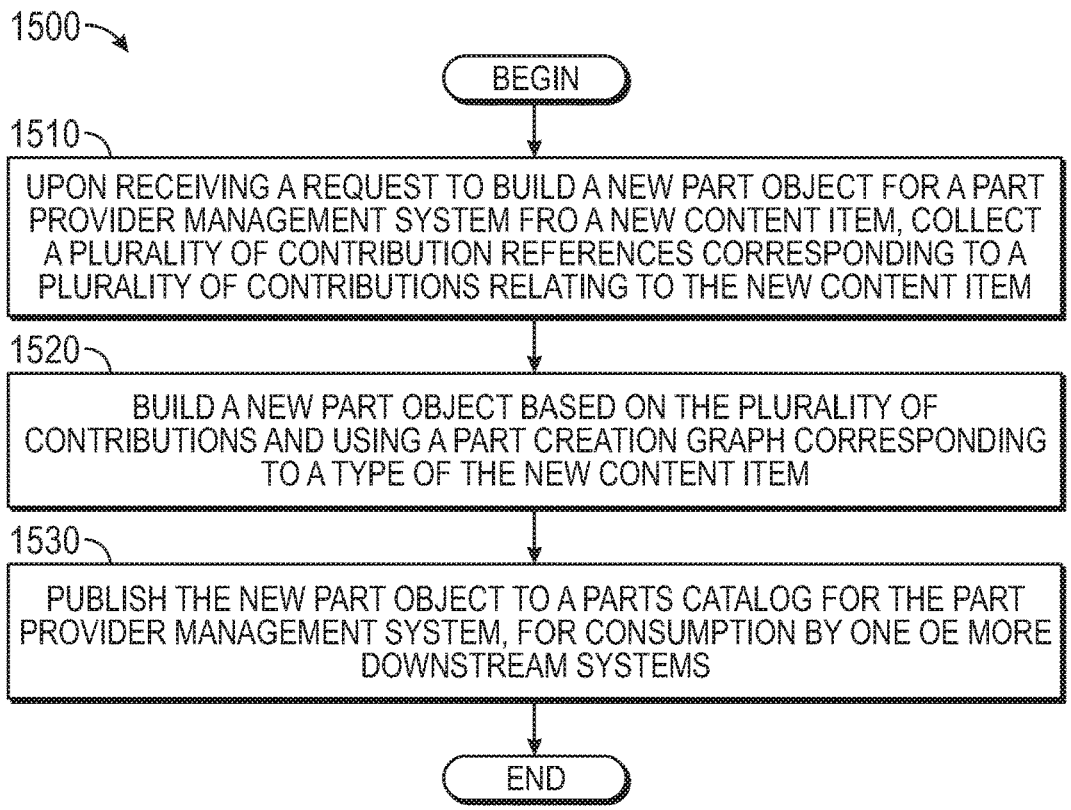
FIG. 15 is a flow diagram, illustrating a method for publishing a new part object, according to one embodiment described herein.

FIG. 15 is a flow diagram, illustrating a method for publishing a part to a parts catalog, according to one embodiment described herein. As shown, the method 1500 begins at block 1510, where upon validating a new schema or schema version, the schema management system 120 stores the new schema or schema version at a schema management system. Upon successfully validating the new content using the new schema or schema version stored at the schema management system, the content provider API 115 stores the new content at a content storage system (block 1520). The part provider management application 135 then ingests the new content item into a part provider management system as a new part object (block 1530), and the method 1500 ends.

Figure 16:
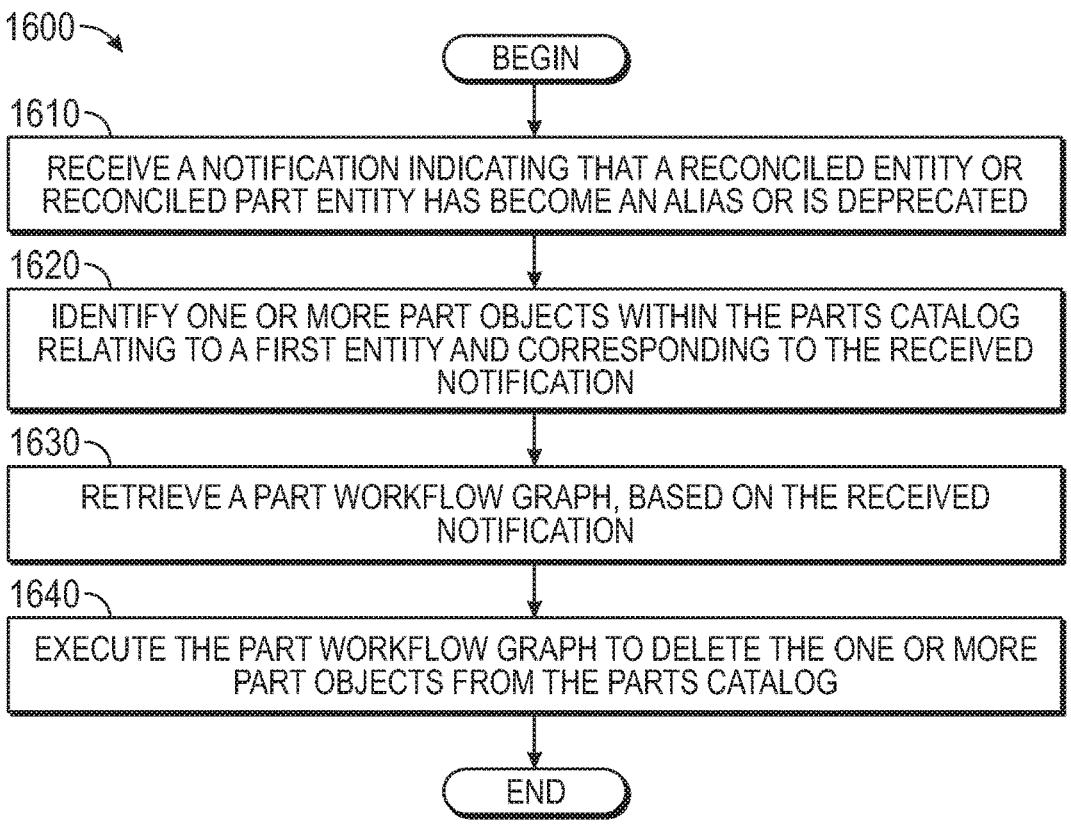
FIG. 16 is a flow diagram, illustrating a method for unpublishing a part object, according to one embodiment described herein.

FIG. 16 is a flow diagram, illustrating a method for publishing a part to a parts catalog, according to one embodiment described herein. As shown, the method 1600 begins at block 1610, where the schema management system 120 receives, from a contributing system, a request to register a new schema or schema version with a schema management system. The schema management system 120 performs a validation operation to validate the new schema or schema version (block 1620), and the schema management system 120 stories the new schema or schema version at the schema management system (block 1630).

Upon receiving a submission of new content for ingestion, the content provider API 115 validates the new content using the new schema or schema version stored at the schema management system (block 1640) and stores the new content at a content storage system 125 (block 1650). The part provider management application 135 builds a new part object based on a plurality of contributions (block 1660) and publishes the new part object to a parts catalog for the part provider management system, for consumption by one or more downstream systems (block 1670), and the method 1600 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., part provider management application 135) or related data available in the cloud. For example, the part provider management application 135 could execute on a computing system in the cloud and could provide the part creation API 137 through which users can request for new content to be ingested as a parts object. In such a case, the part provider management application 135 could execute a parts creation graph workflow to generate a new part object and could insert the new part object into a parts catalog 145, for consumption by downstream computing devices and services. Doing so allows a user to access the part provider management application 135 (e.g., via the part provider API 137) from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a request to generate a new part object within a part provider management system for a new media content item, wherein the request specifies a new media content item identifier corresponding to the new media content item;
   subscribing to one or more notification queues, based on the new media content item identifier specified within received request;
   collecting a plurality of contribution references corresponding to a plurality of contributions, based on notifications received from the one or more notification queues, wherein a first contribution in the plurality of contributions comprises a set of attributes corresponding to the new media content item, and wherein the first contribution is received from a contributing system;
   determining a subset of contributions of the plurality of contributions that are consistent and valid;
   building the new part object based on the subset of contributions, comprising:
      performing a deep validation operation for the contributions in the subset of contributions;
      initiating one or more calls to a lateral dependency Application Programming Interface (API) to initiate one or more operations on content for the subset of contributions; and
      generating the new part object, based on the subset of contributions; and
   publishing the new part object to a parts catalog for the part provider management system, for consumption by one or more downstream systems.

2. The method of claim 1, wherein the subset of contributions are determined to be valid when the contribution references in the subset of contributions pass one or more semantic validation references that are configured to detect syntax errors within the contribution references.

3. The method of claim 1, wherein the subset of contributions are determined to be consistent when the contribution references in the subset of contributions do not contain conflicting information relative to one another.

4. The method of claim 1, wherein the one or more operations relate to ingestion of the new media content item and include at least one of the following operations: (i) encoding one or more video data files, (ii) uploading one or more images to an image server, (iii) performing one or more metadata transformation operations, (iv) merging one or more content rights objects, and (v) merging one or more contract objects.

5. The method of claim 1, wherein subscribing to the one or more notification queues further comprises:
   subscribing, by a contribution poller component, to a contribution notification queue for changes to one or more contributions; and
   subscribing, by a reconciled entity poller component, to a reconciled entity notification queue to changes for one or more reconciled entities.

6. The method of claim 1, wherein collecting the plurality of contribution references corresponding to the plurality of contributions, based on notifications received from the one or more notification queues, further comprises:
   utilizing a plurality of domain-agnostic collection graphs to collect the plurality of contribution references, wherein each of the plurality of domain-agnostic collection graphs comprises a respective workflow for collecting contribution references.

7. The method of claim 6, wherein the plurality of domain-agnostic collection graphs comprises a reconciled entity and territory reaction graph for reconciled entity-level part objects, a reconciled entity and territory reaction graph for reconciled partner entity-level part objects, a reconciled entity reaction graph for reconciled entity-level part objects and a reconciled entity reaction graph for reconciled partner entity-level part objects.

8. A system, comprising:
one or more computer processors; and
a memory containing computer program code that, when executed by operation of the one or more computer processors, performs an operation comprising:
upon receiving a request to build a new part object for a part provider management system for a new media content item, collecting a plurality of contribution references corresponding to a plurality of contributions relating to the new media content item, based on a part creation graph corresponding to a type of the new media content item;
building the new part object based on (i) the plurality of contributions and (ii) using the part creation graph corresponding to the type of the new media content item, wherein building the new part object comprises performing a deep validation operation for contributions in a subset of the plurality of contributions; and
publishing the new part object to a parts catalog for the part provider management system, for consumption by one or more downstream systems, using the part creation graph corresponding to the type of the new media content item.

9. The system of claim 8, wherein building the new part object further comprises:
initiating one or more calls to a lateral dependency Application Programming Interface (API) to initiate one or more operations on content corresponding to the subset of the plurality of contributions; and
generating the new part object, based on the subset of the plurality of contributions and on using the part creation graph.

10. The system of claim 8, the operation further comprising:
determining that the subset of the plurality of contributions are consistent and valid, wherein the subset of the plurality of contributions are determined to be valid when the contribution references in the subset of the plurality of contributions pass one or more semantic validation references that are configured to detect syntax errors within the contribution references, and wherein the subset of the plurality of contributions are determined to be consistent when the contribution references in the subset of the plurality of contributions do not contain conflicting information relative to one another.

11. The system of claim 9, wherein the one or more operations relate to ingestion of the new media content item and include at least one of the following operations: (i) encoding one or more video data files, (ii) uploading one or more images to an image server, (iii) performing one or more metadata transformation operations, (iv) merging one or more content rights objects, and (v) merging one or more contract objects.

12. The system of claim 8, wherein collecting the plurality of contribution references corresponding to the plurality of contributions relating to the new media content item further comprises:
subscribing to one or more notification queues, based on a new media content item identifier specified within received request, wherein the new media content item identifier corresponds to the new media content item.

13. The system of claim 12, wherein subscribing to the one or more notification queues further comprises:
subscribing, by a contribution poller component, to a contribution notification queue for changes to one or more contributions; and
subscribing, by a reconciled entity poller component, to a reconciled entity notification queue to changes for one or more reconciled entities.

14. The system of claim 12, wherein collecting the plurality of contribution references corresponding to the plurality of contributions, based on notifications received from the one or more notification queues, further comprises:
utilizing a plurality of domain-agnostic collection graphs to collect the plurality of contribution references, wherein each of the plurality of domain-agnostic collection graphs comprises a respective workflow for collecting contribution references, wherein the plurality of domain-agnostic collection graphs comprises a reconciled entity and territory reaction graph for reconciled entity-level part objects, a reconciled entity and territory reaction graph for reconciled partner entity-level part objects, a reconciled entity reaction graph for reconciled entity-level part objects and a reconciled entity reaction graph for reconciled partner entity-level part objects.

15. A non-transitory computer readable medium containing computer program code that, when executed by operation of one or more computer processors, performs an operation comprising:
upon receiving a request to build a new part object for a part provider management system for a new media content item, collecting a plurality of contribution references corresponding to a plurality of contributions relating to the new media content item, based on a part creation graph corresponding to a type of the new media content item;
building the new part object based on (i) the plurality of contributions and (ii) using the part creation graph corresponding to the type of the new media content item, wherein building the new part object comprises performing a deep validation operation for contributions in a subset of the plurality of contributions; and
publishing the new part object to a parts catalog for the part provider management system, for consumption by one or more downstream systems, using the part creation graph corresponding to the type of the new media content item.

16. The non-transitory computer readable medium of claim 15, wherein building the new part object further comprises:
initiating one or more calls to a lateral dependency Application Programming Interface (API) to initiate one or more operations on content corresponding to the subset of the plurality of contributions; and
generating the new part object, based on the subset of the plurality of contributions and on using the part creation graph.

17. The non-transitory computer readable medium of claim 15, the operation further comprising:
determining that the subset of the plurality of contributions are consistent and valid, wherein the subset of the plurality of contributions are determined to be valid when the contribution references in the subset of the plurality of contributions pass one or more semantic validation references that are configured to detect syntax errors within the contribution references, and wherein the subset of the plurality of contributions are determined to be consistent when the contribution references in the subset of the plurality of contributions do not contain conflicting information relative to one another.

18. The non-transitory computer readable medium of claim 16, wherein the one or more operations relate to ingestion of the new media content item and include at least one of the following operations: (i) encoding one or more video data files, (ii) uploading one or more images to an image server, (iii) performing one or more metadata transformation operations, (iv) merging one or more content rights objects, and (v) merging one or more contract objects.

19. The non-transitory computer readable medium of claim 15, wherein collecting the plurality of contribution references corresponding to the plurality of contributions relating to the new media content item further comprises:
   subscribing to one or more notification queues, based on a new media content item identifier specified within received request, wherein the new media content item identifier corresponds to the new media content item.

20. The non-transitory computer readable medium of claim 19, wherein subscribing to the one or more notification queues further comprises:
   subscribing, by a contribution poller component, to a contribution notification queue for changes to one or more contributions; and
   subscribing, by a reconciled entity poller component, to a reconciled entity notification queue to changes for one or more reconciled entities.

* * * * *